United States Patent
Butin et al.

(10) Patent No.: US 9,569,231 B2
(45) Date of Patent: Feb. 14, 2017

(54) DEVICE, SYSTEM, AND METHOD FOR PROVIDING INTERACTIVE GUIDANCE WITH EXECUTION OF OPERATIONS

(75) Inventors: Emma Noya Butin, Tel Aviv (IL); Oren Keinan, Netanya (IL)

(73) Assignee: KRYON SYSTEMS LTD., Tel Aviv (IL)

( * ) Notice: Subject to any disclaimer, the term of this patent is extended or adjusted under 35 U.S.C. 154(b) by 878 days.

(21) Appl. No.: 12/320,915

(22) Filed: Feb. 9, 2009

(65) Prior Publication Data
US 2010/0205530 A1 Aug. 12, 2010

(51) Int. Cl.
 *G06F 3/01* (2006.01)
 *G06F 9/44* (2006.01)

(52) U.S. Cl.
 CPC ............ *G06F 9/4446* (2013.01); *G06F 8/38* (2013.01)

(58) Field of Classification Search
 CPC .......... G06F 3/00; G06F 3/048; G06F 9/4446; G06F 8/38
 USPC ........ 715/705, 708, 709, 711, 712, 714, 715
 See application file for complete search history.

(56) References Cited

U.S. PATENT DOCUMENTS

| | | |
|---|---|---|
| 4,622,013 A | 11/1986 | Cerchio |
| 4,648,062 A | 3/1987 | Johnson |
| 4,964,077 A | 10/1990 | Eisen |
| 5,117,496 A | 5/1992 | Stearns |
| 5,121,497 A | 6/1992 | Kerr |
| 5,179,654 A | 1/1993 | Richards |
| 5,261,820 A | 11/1993 | Slye |
| 5,287,448 A * | 2/1994 | Nicol .................... G06F 9/4446 715/707 |
| 5,388,993 A * | 2/1995 | McKiel .............. G09B 19/0053 345/156 |
| 5,395,243 A | 3/1995 | Lubin |
| 5,432,940 A | 7/1995 | Potts |
| 5,475,843 A | 12/1995 | Halviatti |

(Continued)

FOREIGN PATENT DOCUMENTS

| | | |
|---|---|---|
| CA | 2272208 | 11/1999 |
| EP | 0690426 | 1/1996 |

(Continued)

OTHER PUBLICATIONS

Author Unknown, "SHO Player User Guide", [online] [retrieved Sep. 7, 2011]. Retrieved from the internet: <URL: http://www.transcensus.com/player_userguide/sho_player_userguide_5.htm>.

(Continued)

*Primary Examiner* — Anil Bhargava
(74) *Attorney, Agent, or Firm* — Vladimir Sherman; Professional Patent Solutions

(57) ABSTRACT

Device, system, and method for providing interactive guidance with execution of operations. For example, a method of providing interactive guidance to a user of a computerized application includes: receiving a user request to obtain interactive guidance with respect to the computerized application; based on the user request, selectively retrieving an interactive guidance script from a repository of previously-recorded interactive guidance scripts; playing the interactive guidance script with respect to the computerized application; and automatically executing by the interactive guidance script at least one action on behalf of the user with regard to the computerized application.

21 Claims, 7 Drawing Sheets

(56) References Cited

U.S. PATENT DOCUMENTS

| | | | |
|---|---|---|---|
| 5,481,667 A | | 1/1996 | Bieniek |
| 5,488,685 A | * | 1/1996 | Palmer .................. G06F 3/0481 |
| | | | 345/473 |
| 5,546,521 A | | 8/1996 | Martinez |
| 5,577,186 A | | 11/1996 | Mann, II |
| 5,581,684 A | | 12/1996 | Dudzik |
| 5,602,982 A | | 2/1997 | Judd |
| 5,627,958 A | | 5/1997 | Potts |
| 5,640,537 A | | 6/1997 | Jessen |
| 5,680,617 A | | 10/1997 | Gough |
| 5,745,738 A | | 4/1998 | Ricard |
| 5,748,805 A | | 5/1998 | Withgott |
| 5,790,117 A | | 8/1998 | Halviatti |
| 5,825,356 A | * | 10/1998 | Habib .................. G06F 9/4446 |
| | | | 715/707 |
| 5,867,386 A | | 2/1999 | Hoffberg |
| 5,867,678 A | | 2/1999 | Amro |
| 6,020,886 A | * | 2/2000 | Jacober ................. G06F 9/4446 |
| | | | 434/118 |
| 6,252,594 B1 | | 6/2001 | Xia |
| 6,307,544 B1 | | 10/2001 | Harding |
| 6,308,042 B1 | | 10/2001 | Marsh |
| 6,339,436 B1 | * | 1/2002 | Amro .................... G06F 9/4446 |
| | | | 715/201 |
| 6,434,532 B2 | | 8/2002 | Goldband |
| 6,438,545 B1 | | 8/2002 | Beauregard |
| 6,453,254 B1 | | 9/2002 | Bullwinkel |
| 6,563,514 B1 | * | 5/2003 | Samar ............... G06F 17/30899 |
| | | | 707/E17.119 |
| 6,662,340 B2 | | 12/2003 | Rawat |
| 6,687,485 B2 | | 2/2004 | Hopkins |
| 6,690,390 B1 | | 2/2004 | Walters |
| 6,842,877 B2 | | 1/2005 | Robarts |
| 6,937,257 B1 | | 8/2005 | Dunlavey |
| 7,024,633 B1 | | 4/2006 | Mann |
| 7,159,188 B2 | | 1/2007 | Stabb |
| 7,262,778 B1 | | 8/2007 | Edwards |
| 7,441,250 B2 | | 10/2008 | Katz |
| 7,490,292 B2 | | 2/2009 | Hennum |
| 7,543,278 B2 | | 6/2009 | Klementiev |
| 7,546,602 B2 | * | 6/2009 | Hejlsberg .................. G06F 9/54 |
| | | | 717/114 |
| 7,620,895 B2 | | 11/2009 | Adkins |
| 7,675,529 B1 | | 3/2010 | Brunner |
| 7,861,178 B2 | | 12/2010 | Lui |
| 7,890,865 B2 | | 2/2011 | Palmer |
| 7,930,643 B2 | | 4/2011 | Chandhoke |
| 7,987,427 B1 | | 7/2011 | Gough |
| 7,992,101 B1 | | 8/2011 | Chaudhri |
| 8,205,168 B1 | | 6/2012 | Van Slembrouck |
| 2002/0083422 A1 | | 6/2002 | Scouten |
| 2002/0091993 A1 | | 7/2002 | Walley |
| 2002/0186252 A1 | | 12/2002 | Himmel |
| 2003/0001875 A1 | | 1/2003 | Black |
| 2003/0046082 A1 | * | 3/2003 | Siegel ............... G06F 17/30017 |
| | | | 704/270 |
| 2003/0084115 A1 | | 5/2003 | Wood |
| 2003/0142123 A1 | | 7/2003 | Malamud |
| 2003/0163801 A1 | | 8/2003 | Thames |
| 2003/0171926 A1 | * | 9/2003 | Suresh .................... G10L 15/26 |
| | | | 704/270.1 |
| 2003/0210260 A1 | * | 11/2003 | Palmer .................. G06F 3/0481 |
| | | | 715/715 |
| 2003/0219707 A1 | | 11/2003 | Hopkins |
| 2004/0143814 A1 | | 7/2004 | De Jong |
| 2004/0258289 A1 | | 12/2004 | Hornegger |
| 2004/0258298 A1 | | 12/2004 | Chen |
| 2005/0050470 A1 | * | 3/2005 | Hudson ................. G06F 17/246 |
| | | | 715/711 |
| 2005/0080588 A1 | | 4/2005 | Kobayashi |
| 2005/0091612 A1 | | 4/2005 | Stabb |
| 2005/0172018 A1 | * | 8/2005 | Devine ............... G06F 11/0709 |
| | | | 709/223 |
| 2006/0005132 A1 | | 1/2006 | Herdeg, III |
| 2006/0080607 A1 | * | 4/2006 | Cohen .................... G06F 9/4446 |
| | | | 715/705 |
| 2006/0095860 A1 | * | 5/2006 | Wada .................... G06F 3/0481 |
| | | | 715/771 |
| 2006/0168548 A1 | | 7/2006 | Kelley |
| 2006/0177136 A1 | | 8/2006 | Windl |
| 2006/0184880 A1 | | 8/2006 | Bala |
| 2007/0122789 A1 | | 5/2007 | Yoo |
| 2007/0266321 A1 | | 11/2007 | Bicker |
| 2008/0034288 A1 | | 2/2008 | Landar |
| 2008/0086700 A1 | | 4/2008 | Rodriguez |
| 2008/0097984 A1 | | 4/2008 | Candelore |
| 2008/0109722 A1 | * | 5/2008 | Gengler ................. G06F 9/4446 |
| | | | 715/708 |
| 2008/0177994 A1 | | 7/2008 | Mayer |
| 2008/0189612 A1 | | 8/2008 | Zhang |
| 2008/0195946 A1 | * | 8/2008 | Peri-Glass ............ G06F 9/4446 |
| | | | 715/715 |
| 2008/0195958 A1 | | 8/2008 | Detiege |
| 2008/0215976 A1 | | 9/2008 | Bierner |
| 2008/0226119 A1 | * | 9/2008 | Candelore ......... G06F 17/30256 |
| | | | 382/100 |
| 2008/0235339 A1 | | 9/2008 | Lurey |
| 2009/0006985 A1 | * | 1/2009 | Fong ..................... G06Q 40/02 |
| | | | 715/760 |
| 2009/0322790 A1 | | 12/2009 | Behar |
| 2010/0064238 A1 | | 3/2010 | Ludwig |
| 2010/0070448 A1 | | 3/2010 | Omoigui |
| 2010/0161586 A1 | | 6/2010 | Safar |
| 2010/0175021 A1 | | 7/2010 | Ferrara |
| 2010/0205530 A1 | | 8/2010 | Butin |
| 2010/0325540 A1 | | 12/2010 | Biazetti |
| 2011/0047462 A1 | | 2/2011 | Butin |
| 2011/0047514 A1 | | 2/2011 | Butin |
| 2012/0005611 A1 | | 1/2012 | Wey |

FOREIGN PATENT DOCUMENTS

| | | |
|---|---|---|
| GB | 2337612 | 11/1999 |
| WO | 2007008503 A2 | 1/2007 |
| WO | 2007/055610 A1 | 5/2007 |
| WO | 2007/085603 | 8/2007 |

OTHER PUBLICATIONS

Bit Order, captured by the Internet Archive Wayback Machine on Feb. 16, 2005, retrieved Jan. 2012 from http:// web.archive.org/web/20050216154839/http://www.fileformat.info/mirror/egff/ch06_04.htm, pp. 1-3.

Definition of platform webopedia.pdf, captured by the Internet Archive Wayback Machine on Jun. 15, 2007, retrieved Jul. 16, 2013 from http://web. Archive.org/web/20070615144951/http://www.webopedia.com/TERM/P/PLATFORM.html on Jul. 16, 2013, p. 1.

Wikipedia cloud computing.pdf, captured by the Internet Archive Wayback Machine on Jan. 7, 2009, retrieved from http://web.archive.org/web/20090107214626/http://en.wikipedia.org/wiki/Cloud_Computing-html on Jul. 16, 2013 pp. 1,5.

Final rejection of U.S. Appl. No. 12/546,048 dated Jul. 17, 2012.

* cited by examiner

DEVICE, SYSTEM, AND METHOD FOR PROVIDING INTERACTIVE GUIDANCE WITH EXECUTION OF OPERATIONS

FIELD

Some embodiments are related to the field of computerized applications.

BACKGROUND

A Personal Computer (PC) or a mobile device (e.g., a laptop computer, a Personal Digital Assistant (PDA) device) allow users to utilize various applications, for example, word processing applications, spreadsheet applications, Electronic Mail (Email) applications, or the like. These applications may be able to perform hundreds of operations or tasks based on the user's command, for example, editing, calculating, formatting, file handling, data sorting, or the like.

As applications become more and more complex and sophisticated, some users find it necessary to attend a course or seminar which teaches users how to use one or more applications. Some users require assistance from other users (e.g., friends, co-workers, or customer support representatives) in order to be able to complete particular tasks using an application. Furthermore, it may be difficult for the user to find out, or to remember, whether or not an application is capable of performing a particular task, or which sequence of user-initiated steps is required in order to execute a particular task.

Some applications include a "help" function, in which the user may utilize an index of pre-defined topics, or a search based on user-entered keywords, in order to retrieve pre-defined textual descriptions which may assist the user in finding how a particular task is performed. Additionally, some applications are associated with a user's manual, or with a batch of Frequently Asked Questions (FAQ), which may further guide the user on how to perform particular tasks.

Unfortunately, these "help" mechanisms may require the user to perform extensive searching and reading of textual descriptions, and may further require the user to perform—sometimes by trial-and-error—a complex sequence of operations that are described in the textual descriptions in a complicated manner.

SUMMARY

Some embodiments include, for example, devices, systems, and methods for providing interactive guidance with execution of operations.

In some embodiments, for example, a method of providing interactive guidance to a user of a computerized application includes: receiving a user request to obtain interactive guidance with respect to the computerized application; based on the user request, selectively retrieving an interactive guidance script from a repository of previously-recorded interactive guidance scripts; playing the interactive guidance script with respect to the computerized application; and automatically executing by the interactive guidance script at least one action on behalf of the user with regard to the computerized application.

In some embodiments, for example, playing the interactive guidance script includes performing at least one of: imitating a mouse movement; imitating a mouse click; and imitating a press of one or more keyboard keys.

In some embodiments, for example, playing the interactive guidance script further includes: displaying a guide-bubble associated with a screen of the computerized application.

In some embodiments, for example, displaying the guide-bubble includes performing at least one of: displaying a location-based guide-bubble pointing to a particular item of the screen; and displaying a pointer-less guide-bubble associated with the screen.

In some embodiments, for example, displaying the guide-bubble includes performing at least one of: displaying a mandatory guide-bubble which requires receiving user input in order to advance the playing of the interactive guidance script; and displaying an optional guide-bubble which requests user input and may be skipped by the user in order to advance the playing of the interactive guidance script.

In some embodiments, for example, selectively retrieving the interactive guidance script includes selecting the interactive guidance script based on at least one of: a hierarchical tree of categories of interactive guidance scripts; tag-based navigation among tags associated with interactive guidance scripts; textual search of text items associated with interactive guidance scripts; navigation through historic search items of the user; and navigation through historic search items of one or more other users.

In some embodiments, for example, the method includes: in connection with playing the interactive guidance script, modifying a display of the computerized application presented to the user by performing at least one of: restoring a window; closing a window; modifying a size of a window; modifying a location of a window; modifying a property of a window; maximizing a window; minimizing a window; and opening a window.

In some embodiments, for example, playing the interactive guidance script includes at least one of: calling from the interactive guidance script another interactive guidance script; checking whether or not a condition holds true in order to determine whether or not perform a script action; jumping from a first location of the interactive guidance script to a second location of the interactive guidance script; and validating data received from the user during the playing of the interactive guidance script.

In some embodiments, for example, playing the interactive guidance script includes at least one of: performing Optical Character Recognition (OCR) on a display showing the computerized application to determine a location of a textual item on which a script action is to be performed; and performing image recognition on the display showing the computerized application to determine a location of a graphical item on which a script action is to be performed.

In some embodiments, for example, the method includes: presenting to the user a toolbar including one or more of: a selectable option to pause the playing of the interactive guidance script; and a selectable option to stop the playing of the interactive guidance script.

In some embodiments, for example, the computerized application includes an application selected from the group consisting of: an application capable of running on a computer, an application capable of running on a mobile phone, an application capable of running on a mobile computing device, an application capable of running on a handheld computing device, an Operating System, an application capable of running on a gaming console, an application capable of running on a gaming device, and an application capable of running on an electronic device having a User Interface (UI).

In some embodiments, for example, playing the interactive guidance script is in response to receiving a user command through a helper module, and the helper module is selected from the group consisting of: an add-on to the computerized application; a plug-in of the computerized application; an extension of the computerized application; a module embedded within the computerized application; a module of the computerized application; a help module internal to the computerized application; a help module external to the computerized application; a help module associated with the computerized application; an interface component internal to the computerized application; a particular guidance module adapted to provide guidance to the computerized application; and a general guidance module adapted to provide guidance to a plurality of computerized applications.

In some embodiments, a system for providing interactive guidance to a user of a computerized application includes: a user interface to receive a user request to obtain interactive guidance with respect to the computerized application; a helper module to selectively retrieve, based on the user request, an interactive guidance script from a repository of previously-recorded interactive guidance scripts; and a script player to play the interactive guidance script with respect to the computerized application, and to automatically execute at least one action on behalf of the user with regard to the computerized application.

In some embodiments, for example, the script player is to imitate at least one of: a mouse movement; a mouse click; and a press of one or more keyboard keys.

In some embodiments, for example, the script player is to display a guide-bubble associated with a screen of the computerized application.

In some embodiments, for example, the script player is to display at least one of: a location-based guide-bubble pointing to a particular item of the screen; and a pointer-less guide-bubble associated with the screen.

In some embodiments, for example, the script player is to display at least one of: a mandatory guide-bubble which requires receiving user input in order to advance the playing of the interactive guidance script; and an optional guide-bubble which requests user input and may be skipped by the user in order to advance the playing of the interactive guidance script.

In some embodiments, for example, the helper module is to select the interactive guidance script based on at least one of: a hierarchical tree of categories of interactive guidance scripts; tag-based navigation among tags associated with interactive guidance scripts; textual search of text items associated with interactive guidance scripts; navigation through historic search items of the user; and navigation through historic search items of one or more other users.

In some embodiments, for example, in connection with playing the interactive guidance script, the script player is to modify a display of the computerized application presented to the user by performing at least one of: restoring a window; closing a window; modifying a size of a window; modifying a location of a window; modifying a property of a window; maximizing a window; minimizing a window; and opening a window.

In some embodiments, for example, the script player is to perform at least one of: calling from the interactive guidance script another interactive guidance script; checking whether or not a condition holds true in order to determine whether or not perform a script action; jumping from a first location of the interactive guidance script to a second location of the interactive guidance script; and validating data received from the user during the playing of the interactive guidance script.

In some embodiments, for example, the script player is to perform at least one of: Optical Character Recognition (OCR) on a display showing the computerized application to determine a location of a textual item on which a script action is to be performed; and image recognition on the display showing the computerized application to determine a location of a graphical item on which a script action is to be performed.

In some embodiments, for example, the user interface is to present to the user a toolbar including one or more of: a selectable option to pause the playing of the interactive guidance script; and a selectable option to stop the playing of the interactive guidance script.

In some embodiments, for example, the computerized application includes an application selected from the group consisting of: an application capable of running on a computer, an application capable of running on a mobile phone, an application capable of running on a mobile computing device, an application capable of running on a handheld computing device, an Operating System, an application capable of running on a gaming console, an application capable of running on a gaming device, and an application capable of running on an electronic device having a User Interface (UI).

In some embodiments, for example, the helper module includes a component selected from the group consisting of: an add-on to the computerized application; a plug-in of the computerized application; an extension of the computerized application; a module embedded within the computerized application; a module of the computerized application; a help module internal to the computerized application; a help module external to the computerized application; a help module associated with the computerized application; an interface component internal to the computerized application; a particular guidance module adapted to provide guidance to the computerized application; and a general guidance module adapted to provide guidance to a plurality of computerized applications.

In some embodiments, for example, the user request to obtain interactive guidance is received through at least one of: a toolbar, a button, a menu, a drop-down menu, a pane, a link, a hyperlink, an icon, a textual item, a graphical representation, a clickable item, and a selectable item.

Some embodiments may include, for example, a computer program product including a computer-useable medium including a computer-readable program, wherein the computer-readable program when executed on a computer causes the computer to perform methods in accordance with some embodiments.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
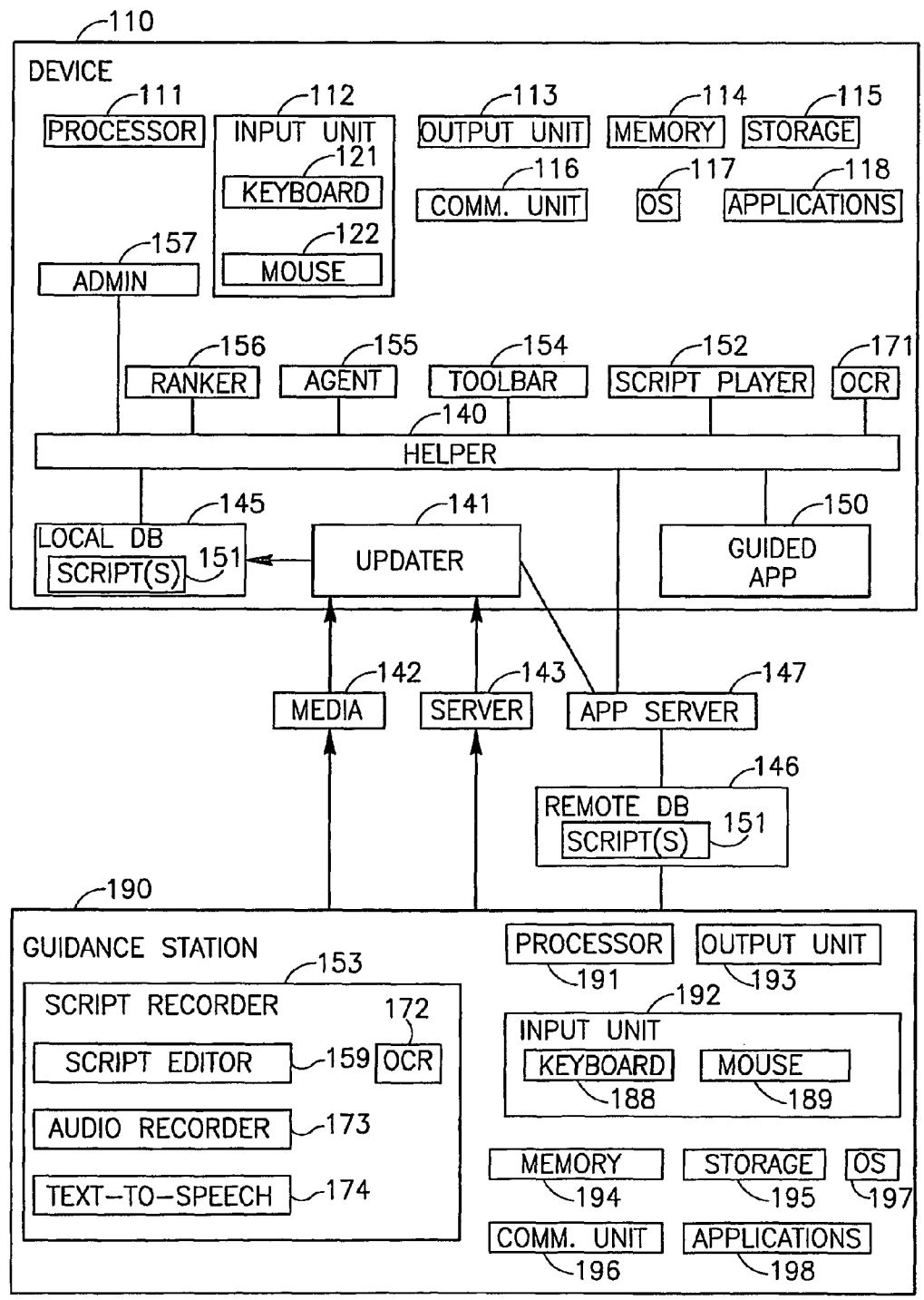
FIG. 1 is a schematic block diagram illustration of a system in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

The terms "plurality" or "a plurality" as used herein include, for example, "multiple" or "two or more". For example, "a plurality of items" includes two or more items.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device (e.g., a device incorporating functionalities of multiple types of devices, for example, PDA functionality and cellular phone functionality), a vehicular device, a non-vehicular device, a mobile or portable device, a non-mobile or non-portable device, a wireless communication station, a wireless communication device, a wireless Access Point (AP), a wireless Base Station (BS), a Mobile Subscriber Station (MSS), a wired or wireless Network Interface Card (NIC), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.16m standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or tag or transponder, a device which utilizes Near-Field Communication (NFC), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a "smartphone" device, a wired or wireless handheld device (e.g., BlackBerry®, Palm® Treo™), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDM Access (OFDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), IEEE 802.11 ("Wi-Fi"), IEEE 802.16 ("Wi-Max"), ZigBee™, Ultra-Wideband (UWB), Global System for Mobile communication (GSM), 2G, 2.5G, 3G, Third Generation Partnership Project (3GPP), 3GPP Long Term Evolution (LTE), 3.5G, or the like. Some embodiments may be used in conjunction with various other devices, systems and/or networks.

The terms "wireless device", "wireless computing device", "mobile device" or "mobile computing device" as used herein include, for example, a mobile or portable or light-weight or compact device capable of wireless communication, a communication device capable of wireless communication, a mobile phone, a cellular phone, a "smartphone", a laptop or notebook computer capable of wireless communication, a PDA device capable of wireless communication, a handheld device capable of wireless communication, or the like.

The terms "device" or "computerized device" as used herein include, for example, a computer, a Personal Computer (PC), a laptop computer, a notebook computer, a server computer, a tablet computer, a PDA device, a mobile phone, a cellular phone, a "smartphone", a handheld device, a communication device, a wireless communication device, a wireless device, a gaming console, a television set-top box, or other electronic devices.

The terms "application" or "Web application" as used herein include, for example, a software application, a program, a Web-based or Internet-based application (e.g., implemented and/or running using a Web browser), a program implemented using hardware (e.g., an embedded program, a firmware program, a program stored in Read Only Memory (ROM), or the like), an application located on a remote server an accessible through the Internet or the World Wide Web using a browser, an application located on a local server or a network server or a network device and accessible using a network (e.g., an intranet, a local network, a LAN, a WAN, or the like) using a Web browser, an application which is accessible and/or usable through a Web browser regardless of the location of the server on which the application code is stored and/or regardless of the location in which the Web browser runs, an application accessible through an enterprise network or an organizational network (e.g., a common workplace), or other suitable types of applications and/or computer programs. In some embodiments, an "application" may include an Operating System (OS) or portions thereof or applications thereof; for example, some embodiments may provide interactive guidance to users with regard to the operation of the OS itself or OS portions or OS applications (e.g., the "Control Panel" or the "Windows Media Player" of Microsoft® Windows® Operating System).

The terms "web" or "Web" as used herein includes, for example, the World Wide Web; a global communication system of interlinked and/or hypertext documents, files, web-sites and/or web-pages accessible through the Internet or through a global communication network; including text, images, videos, multimedia components, hyperlinks, or other content.

The term "user" as used herein includes, for example, a person or entity that owns a computing device or a wireless device; a person or entity that operates or utilizes a computing device or a wireless device; or a person or entity that is otherwise associated with a computing device or a wireless device.

The term "help" as used herein includes, for example, guidance and/or assistance and/or explanations and/or details and/or instructions provided to a user in order to assist the user to locate and/or perform a particular task or operations or sequence of operations; textual and/or graphical and/or audible and/or visual and/or audio-visual and/or animated output produced by a computerized device and presented to the user as help; or other suitable types of user guidance.

The term "imitate" as used herein includes, for example, simulate, emulate, demonstrate, perform an operation similar to another operation, perform an operation which demonstrates how to perform another operation, present to a user animation guiding the user how to perform an operation, moving and/or animating a pseudo-cursor, performing an actual operation of a guided application on behalf of the user or instead of the user, automatically or semi-automatically executing a function of a guided application instead of the user or on the user's behalf, or the like.

Although portions of the discussion herein may relate, for demonstrative purposes, to a "toolbar" which is used, for example, in order to launch and/or operate the recording and/or the playback of guidance script(s), some embodiments are not limited in this regard, and may utilize other suitable interface component(s) which may not necessarily include a toolbar; for example, a menu, a drop-down menu, a pane, a button, a link, a hyperlink, an icon, a textual or graphical representation, a clickable item, a selectable item, or the like. Accordingly, the term "toolbar" as used herein may include any such others interface components.

At an overview, some embodiments include devices, systems, and methods of providing help to users of computerized devices and applications, and of executing operations of an application on behalf of such users or instead of such users. Some embodiments provide to a user a step-by-step interactive navigation guide in order to teach the user how to utilize a computerized application, together with actually executing the required steps in parallel to explaining them. In some embodiments, a user interface receives user input (e.g., questions, commands, keywords, or the like) from a user and/or from other sources, and automatically communicates with knowledge databases and outputs to the user an interactive navigation guide. For example, some embodiments determine what the user is doing or is attempting to do (e.g., based on current and/or past movements of a cursor or a mouse, based on past current and/or past keystrokes, based on current and/or past content of the screen, based on a user-provided question and/or command and/or keyword and/or phrase), and in response, interactively guide the user to perform the function or task that the user is interested in performing ("task of interest" or "operation of interest"), and/or execute the required steps automatically on behalf of the user or semi-automatically (e.g., obtaining the user's input only when required for the execution).

In some embodiments, for example, an application is running and an external source or a user requests to perform a particular function, which is performed via providing or inputting or typing in a question, a command, a keyword, a phrase, a menu, voice recognition, tag-oriented navigation, category-oriented navigation, or the like (an "inquiry") into the user interface. The user interface automatically communicates with one or more databases to which it is linked, and outputs a result. The result includes recognition of the input inquiry, and guides the user via one or more types of pointer visualization (e.g., "pseudo-cursor") movements and/or via imitating keyboard clicks; such guidance is interactive and communicates with the user when additional information is required in order to complete the inquiry and/or to actually execute and complete the function that the user is interested in.

It is noted that some embodiments provide actual execution of operations (including mouse movement, mouse clicking, keyboard strikes, or the like) by an automatic help module, instead of by the user, in order to achieve particular functions or features of the guided application. In contrast with some conventional help systems, which are limited to, at most, presenting a "fake" or artificial movie clip demonstrating how to perform an operation of the guided application, some embodiments actually perform the operation automatically for the user, and together with showing to the user an animated explanation (and optionally an audio-narrated description) of the operations as they are performed automatically by the helper module. Accordingly, portions of the discussion herein which may relate, for demonstrative purposes, to "imitating" or to "demonstrating" an operation, or to "guiding" or "guidance", should be constructed, in some embodiments, as including not (only) an artificial demonstration or explanation to the user (who then has to perform by himself the actual operation demonstrated to him), but rather as an actual execution by the helper module of the steps needed to achieve the relevant function or feature.

In some embodiments, the execution may be fully automatic, such that the helper module entirely performs all the operations required to achieve the function or feature (e.g., the user requests guidance on how to print a document; and the helper module playbacks a guidance script which demonstrates and also performs all the actual operations, such that the document is actually printed automatically). In other embodiments, the execution may be semi-automatic or partially-automatic (e.g., the user requests guidance on how to change a password; and the helper module playbacks a guidance script which demonstrates and performs the actual operations automatically, while pausing through the process to receive from the user the required input to be used as the password). Other suitable mechanisms may be used.

Although portions of the discussion herein relate, for demonstrative purposes, to actions performed using a mouse (e.g., mouse movement or mouse clicks), some embodiments are not limited in this regard, and are capable of similarly handling, demonstrating, imitating, performing and/or executing other types of actions and other types of input-providing operations, for example, keystrokes, striking of one or more keys in a keyboard, a sequence of keystrokes, a combination of simultaneous keystrokes, typing of text, or the like. Accordingly, discussions herein relating to mouse actions may similarly apply to keyboard actions or to actions that are executed using other types of input devices.

FIG. 1 schematically illustrates a block diagram of a system 100 in accordance with some demonstrative embodiments. System 100 includes a device 110, for example, for example, a desktop computer, a Personal Computer (PC), a laptop computer, a notebook computer, a tablet computer, a PDA device, a cellular phone, a mobile phone, a hybrid device (e.g., combining one or more cellular phone functionalities with one or more PDA device functionalities), a portable audio player, a portable video player, a portable audio/video player, a portable media player, a portable device having a touch-screen, a relatively small computing device, a non-desktop computer or computing device, a portable device, a handheld device, a "Carry Small Live Large" (CSLL) device, an Ultra Mobile Device (UMD), an Ultra Mobile PC (UMPC), a Mobile Internet Device (MID), a Consumer Electronic (CE) device, an "Origami" device or computing device, a device that supports Dynamically Composable Computing (DCC), a context-aware device, or the like.

In some embodiments, device 110 may include non-mobile computing devices or peripherals, for example, a desktop computer, a Personal Computer (PC), a server computer, a printer, a laser printer, an inkjet printer, a color printer, a stereo system, an audio system, a video playback system, a DVD playback system a television system, a television set-top box, a television "cable box", a television converter box, a digital jukebox, a digital Disk Jockey (DJ) system or console, a gaming console, a gaming system, a media player system, a home theater or home cinema system, or the like.

In some embodiments, device 110 may be implemented using suitable hardware components and/or software components, for example, a processor 111, an input unit 112, an output unit 113, a memory unit 114, a storage unit 115, and a communication unit 116.

Processor 111 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or other suitable multi-purpose or specific processor or controller. Processor 111 executes instructions, for example, of an Operating System (OS) 117 or of one or more applications 118.

Input unit 112 includes, for example, a keyboard 121, a keypad, a mouse 122, a touch-pad, a touch-screen, a joystick, a track-ball, a stylus, a microphone, and/or other suitable pointing unit or input device.

Output unit 113 includes, for example, a monitor, a screen, a touch-screen, a Cathode Ray Tube (CRT) display unit, a Liquid Crystal Display (LCD) display unit, a plasma display unit, one or more audio speakers or earphones, or other suitable output devices.

Memory unit 114 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 115 includes, for example, a hard disk drive, a floppy disk drive, a Solid-State Disk (SSD), a Compact Disk (CD) drive, a CD-ROM drive, a Digital Versatile Disk (DVD) drive, an internal or external database or repository, or other suitable removable or non-removable storage units. Memory unit 114 and/or storage unit 115, for example, store data processed by device 110.

Communication unit 116 includes, for example, a wired or wireless transceiver, a wired or wireless modem, a wired or wireless Network Interface Card (NIC), a wired or wireless communication adapter, or other unit suitable for transmitting and/or receiving communication signals, blocks, frames, transmission streams, packets, messages and/or data. Optionally, communication unit 116 includes, or is associated with, one or more antennas or one or more sets of antennas.

In some embodiments, some or all of the components of device 110 are enclosed in a common housing or packaging, and are interconnected or operably associated using one or more wired or wireless links. In other embodiments, some components of device 110 may be distributed among multiple or separate devices or locations.

Device 110 includes a guided application 150, for example, an application being used by a user of device 110, and/or an application for which a user of device 110 is interested in receiving guidance for. The guided application 150 may be, for example, a word processing application, a spreadsheet application, an Email application, a photo editing application, or the like. In some embodiments, the guided application 150 may be stored locally; in other embodiments, the guided application 150 may be stored remotely (e.g., on a server, on a remote server, on a network, or the like), or may be a Web-based or Internet-based application.

System 100 further includes a helper 140, for example, a module or software component able to interactively guide the user with respect to the guided application 150. The helper 140 may be implemented, for example, as an integral part of the guided application 150 (e.g., "OEM version"); as an add-on or plug-in or extension to the guided application 150; as a stand-alone software component; as a component of the OS 117; as a general software component able to guide multiple types of guided applications 150; as a specific component able to guide a particular guided application 150; or the like. In some embodiments, the particular implementation of the helper 140, as an "add-on" component to the guided application 150 or as an "integrated" component within the guided application 150, may affect the operational implementation of helper 140. For example, an "add-on" implementation of helper 140 may require utilization of Optical Character Recognition (OCR) and/or other image recognition techniques, in order to determine externally to the guided application 150 which actions take place and what is displayed by the guided application 150; in contrast, an "integrated" implementation of helper 140 may operate in coordination with the guided application, and may receive internal cues or signals from the guided application 150 with regard to actions performed, information displayed, or the like.

Some embodiments may utilize a local or stand-alone application, client/server architecture, publisher/subscriber architecture, fully centralized architecture, partially centralized architecture, fully distributed architecture, partially distributed architecture, scalable Peer to Peer (P2P) architecture, or other suitable architectures or combinations thereof.

Although portions of the discussion herein may relate for demonstrative purposes, to a computerized system 100 having a device 110 implemented as a computer, some embodiments may be utilized with conjunction with other systems and/or devices having a user interface, for example, mobile phones, cellular phones, smart-phones, PDA devices, handheld devices, portable devices, gaming devices, gaming consoles, or the like. In some embodiments, high-end and more powerful devices may allow "add-on" implementation of helper 140; whereas low-end and less powerful devices may allow "integrated" implementation of helper 140.

In some embodiments, for example, the helper 140 may be associated with a local database 145, for example, implemented as a component of helper 140 or as a component of device 110 (e.g., stored in storage unit 115). In other embodiments, the helper 140 may be associated with a remote database 146, either directly or indirectly (e.g., through an application server 147), over one or more wired and/or wireless links (e.g., Internet, Intranet, network, or the like).

In some embodiments, for example, system 100 may be a local or stand-alone system, such that the helper 140 includes, or is able to locally access, substantially all the data required for guiding the user with respect to the guided application 150, by accessing the local database 145 and without the need to access a remote database (e.g., remote database 146). For example, device 110 may include a playback module (as described herein), but may not necessarily include a recording module. The local database 145 may be periodically, manually and/or automatically updated by an updater module 141, using one or more external sources, for example, a remote server 143, an Internet server, an Intranet server, an external file stored on removable media 142 (e.g., CD or DVD) or on a file server, or the like.

The database from which the helper 140 obtains information may be updated by an administrator utilizing a guidance station 190. For example, the guidance station 190 may be used to update the remote database 146, from which the helper 140 obtains guidance information in a client/server implementation. Additionally or alternatively, the guidance station may be used to create update files, stored in the removable media 142 or by the sever 143, and the update files are then used by the updater module 141 in order to update the local database 145 from which the helper 140 obtains guidance information. Other suitable architectures (e.g., distributed or peer-to-peer) may be used.

In some embodiments, the guidance station 190 may be implemented using a Personal Computer (PC) including suitable hardware components and/or software components, for example, a processor 191, an input unit 192 (e.g., a keyboard 188 and a mouse 189), an output unit 193, a memory unit 194, a storage unit 195, a communication unit 196, an OS 197, and one or more applications 198.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or other suitable multi-purpose or specific processor or controller. Processor 191 executes instructions, for example, of an Operating System (OS) 197 or of one or more applications 198.

Input unit 192 includes, for example, a keyboard 188, a keypad, a mouse 189, a touch-pad, a touch-screen, a joystick, a track-ball, a stylus, a microphone, and/or other suitable pointing unit or input device.

Output unit 193 includes, for example, a monitor, a screen, a touch-screen, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Solid-State Disk (SSD), a Compact Disk (CD) drive, a CD-ROM drive, a Digital Versatile Disk (DVD) drive, an internal or external database or repository, or other suitable removable or non-removable storage units. Memory unit 194 and/or storage unit 195, for example, store data processed by guidance station 190.

Communication unit 196 includes, for example, a wired or wireless transceiver, a wired or wireless modem, a wired or wireless Network Interface Card (NIC), a wired or wireless communication adapter, or other unit suitable for transmitting and/or receiving communication signals, blocks, frames, transmission streams, packets, messages and/or data. Optionally, communication unit 196 includes, or is associated with, one or more antennas or one or more sets of antennas.

In some embodiments, some or all of the components of guidance station 190 are enclosed in a common housing or packaging, and are interconnected or operably associated using one or more wired or wireless links. In other embodiments, some components of guidance station 190 may be distributed among multiple or separate devices or locations.

As further described in detail herein, guidance station 190 may further include a script recorder 153, which may include (or may be associated with) a script editor 159, an OCR engine 172, and other suitable components (e.g., an audio recorder module 173 and a text-to-speech module 174). The functions and operability of these components are described in detail herein.

The helper 140 may be used as an interactive tutorial and navigation tool for the guided application 150. For example, the user enters a question about using and/or operating the guided application 150 or a feature or function thereof, and the helper 140 obtains and presents to the user the interactive guidance and navigation, and actually executes the required operations automatically and instead of the user, based on pre-recorded and pre-stored guidance scripts 151 which may be played-back to the user of device 110. In some embodiments, for example, the interactive help is presented using an actual cursor or using a "pseudo-cursor" that is automatically displayed and moved over the guided application 150 windows, and which automatically "clicks" the required mouse clicks and enters the required keyboard presses or keystrokes, thereby executing actual commands and operations on the guided application 150, based on the relevant pre-defined guidance script 151. During playback of the guidance script 151, the user might be requested to interfere by performing an action, for example, input of data or selection of data. The playback of the guidance script 151 pauses until the user finishes with the interactive action required from the user. The playback of the guidance script 151 on device 110 may be performed and/or controlled, for example, by a script player 152, e.g., implemented as a module or component of the helper 140, which demonstrates to the user step-by-step how to perform the relevant function and executes the steps on behalf of the user, automatically or semi-automatically.

The guidance script 151 is obtained by the helper 140 from a database or repository of previously-created guidance scripts 151, namely, from the local database 145 and/or from the remote database 146. The guidance scripts 151 creation is performed in advance by a guidance professional (e.g., a trainer, a teacher, an instructor, a support specialist, an administrator, or the like), for example, using a script recorder 153 which may be a module or component of the guidance station 190. In some embodiments, for example, a separate guidance script 151 is prepared per guided application 150, or per feature of function of a guided application, or for a question associated with a guided application 150.

In some embodiments, script player 152 may be able to correctly playback a guidance script 151 on device 110 independent of the screen resolution (e.g., measured in pixels) and/or the screen dimensions (e.g., measured in inches) of the display unit of device 110. In some embodiments, different guidance scripts 151 may be prepared to support different screen resolutions or dimensions; in other embodiments, a single guidance script 151 may be prepared, and the script player 152 may perform the operations and calculations required in order to correctly playback the guidance script 151 on the particular device 110 having the particular screen resolution and dimensions, such that accurate execution of step-by-step operations may be achieved.

In some embodiments, the guidance script(s) 151 may be used to provide interactive guidance and to execute operations on behalf of the user with respect to a guided application 150 having a standard (e.g., "factory preset" or "default") user interface, as well as user-defined or user-customizable user interface (e.g., if the user changes the location of buttons or panes, or adds or removes buttons or interface components).

In some embodiments, the guidance script 151 may be associated with (or may point to) one or more audio files or clips, video files or clips, audio-visual files or clips, animation files or clips, or other rich content components or multimedia components. The script player 152 may dynamically and automatically play such clips, at the appropriate timing defined in the guidance script 151, and at the screen location defined by the guidance script 151. This may be performed, for example, in addition to or in parallel to other operations performed by the script player 152, for example, movement of a pseudo-cursor, presentation of "pop-up" windows or "bubbles" of information, fading-in or fading-out of information, actual execution of operations (e.g., cursor movement, mouse-pointer movement, key striking) on behalf of the user or instead of the user, or the like.

In some embodiments, an instance of the helper 140, or an instance of the script player 152, may support two or more applications running in parallel on device 110. In some embodiments, helper 140 may optionally track and collect data about inquiries by the user of device 110, and may periodically transfer or export the collected data (e.g., to guidance station 190 or to application server 137) to allow the guide to improve the guidance scripts 151 and/or to add new guidance scripts 151.

In some embodiments, the guidance script 151 appropriate for answering the inquiry of the user is selected locally by the helper 140 (e.g., if the local database 145 is accessed) or remotely by the application server 147 (e.g., if the remote database 146 is accessed). In some embodiments, a pre-defined selection algorithm may be used, for selection of a particular guidance script 151 or for ranking of multiple guidance scripts 151 in response to a user inquiry. The selection algorithm may take into account one or more parameters, for example: textual similarity (e.g., between the user's inquiry and a textual description of a guidance script 151); statistics about search history of a group of users, or of all users; statistics about search history of the particular user of device 110; relevancy to the application's active window; relevancy to a selected object in the application; or the like.

In some embodiments, the user may obtain the interactive guidance, or may search the database(s) of guidance scripts 151, using one or more methods, for example: free-text search; hierarchical navigation through the database of guidance scripts 151 using a hierarchical tree of categories and sub-categories; tags navigation, utilizing a display of relevant tags or keywords that are shown in different font sizes according to relevancy, based on the ranking algorithm; private search history of the particular user of device 110 (e.g., recent inquiries of that user); "favorite" searches or queries that were saved, "bookmarked" or otherwise "pinned" by a particular user, by a group of users (e.g., of an organization or enterprise), or by substantially all users; a list of suggested queries that are presented to the user based on analysis of the action that the user is currently performing or attempting to perform; or the like. In some embodiments, interactive guidance may be automatically triggered and/or launched by system 100, for example, upon detection that the user is currently performing or attempting to perform a particular action, or upon detection of particular data entered by the user, or upon detection of a particular change in the application operation.

In some embodiments, the helper 140 is utilized by the user of device 110 in order to search for guidance and, as a result, to obtain the appropriate guidance which automatically executes based on the relevant guidance script 151 with respect to the guided application 150. Optionally, the helper 140 may include, or may be associated with, a toolbar 154 which may facilitate the user's interaction once the user inquires for guidance.

The toolbar 154 may be in "shutdown" mode, hidden and not displayed to the user; this may occur, for example, when the guided application 150 is not identified (e.g., by an agent module 155, as described herein).

Alternatively, the toolbar 154 may be in "standby" mode, waiting for the user to input his query. The toolbar 154 is in "standby" mode when the agent module 155 identified at least one relevant guided application 150. In this mode, the toolbar 154 is shown to the user in one of multiple (e.g., pre-defined and/or user-defined) ways, for example: a system tray icon, such that the toolbar 154 is hidden from the user until the user double-clicks the icon, thereby switching the toolbar 154 into "open" mode; a floating button on the screen, displayed on top of substantially all other applications; a desktop shortcut; a hyperlink; a link; a button; a desktop gadget or applet; a clickable item; a selectable item; a textual or graphical component; an icon; or other suitable representation or interface component(s). The location of the button or other interface component(s) may be dragged by the user to substantially anywhere on the screen. Optionally, the button is semi-transparent, and only when the user moves the cursor over the button, the button turns into opaque of otherwise fades-in. Clicking the button or pressing a pre-defined combination of shortcut keys switches the toolbar 154 into "open" mode. In some embodiments, toolbar 154 may be implemented as an application or interface component running in the background and not necessarily visible to the user and/or accessible to the user (at all times, or at all); or as other suitable type of application, module, or interface component.

In the "open" mode, the toolbar 154 is fully opened and shown to the user, who may input a search query and navigate the database of guidance scripts 151 in one or more ways. The toolbar 154 may include a "play" button that allows the user to start playback of the selected guidance script 151, thereby entering "play mode"). The toolbar 154 switches back into "standby" upon clicking again on the main floating button, or by pressing a pre-defined combination of shortcut keys.

In the "play" mode, the toolbar 154 remains visible to the user, but the "play" button switches to a "stop" button that allows the user to stop the playback of the guidance script 151 at any time; stopping may be achieved also by pressing a pre-defined shortcut key. In "play" mode, the toolbar 154 may be semi-transparent so as to not interrupt the user from focusing on the guidance script 151 being played in the guided application 150. The toolbar 154 may return to be opaque when the guidance script 151 playback ends, or when the user locate the cursor over the toolbar 154.

At any toolbar mode (except "shutdown"), the user may relocate the toolbar 154 to any place on the screen, including while a guidance script 151 is being played and while actions are automatically executed by helper 140 on behalf of the user. In some embodiments, while a guidance script 151 is playing, the toolbar 154 may be moved automatically if its location may interrupt the guidance script 151 playback, for example, if the toolbar 154 is located over a text field that the user needs to utilize in order to input data.

In some embodiments, a single instance of the helper 140 may operate with several concurrently-running guided applications 150. For example, the user of device 150 may select the relevant application for his query (e.g., when the toolbar 154 is in "open" mode). The relevant applications list may be dynamically updated, for example, upon a launch or a termination of an application on device 110. The selection of the relevant guided application 150 may be performed automatically or manually. In the automatic selection, the helper 140 automatically determines what is the last application that the user was working on (e.g., according to the last active window), and automatically selects that application as the default guided application 150 for the next user query. In the manual selection, a menu or a combo box in the toolbar 154 may allow the user to switch among multiple guided applications 150.

Reference is made to FIGS. 2A-2D, which schematically illustrate a toolbar 200 in accordance with some demonstrative embodiments. Toolbar 200 may be a demonstrative implementation of toolbar 154 of FIG. 1.

Toolbar 200 includes multiple user-selectable buttons or regions. For example, a main help button 210 allows the user to close the toolbar 200 or to minimize it; a text query button 211 allows the user to initiate a textual query for guidance; a hierarchical navigation button 212 allows the user to initiate hierarchical navigation for guidance; a tag navigation button 213 allows the user to initiate tag navigation for guidance; a private search history button 214 allows the user to initiate guidance navigation based on his private search history; and other suitable buttons or interface components may be included in toolbar 200.

Figure 2A:
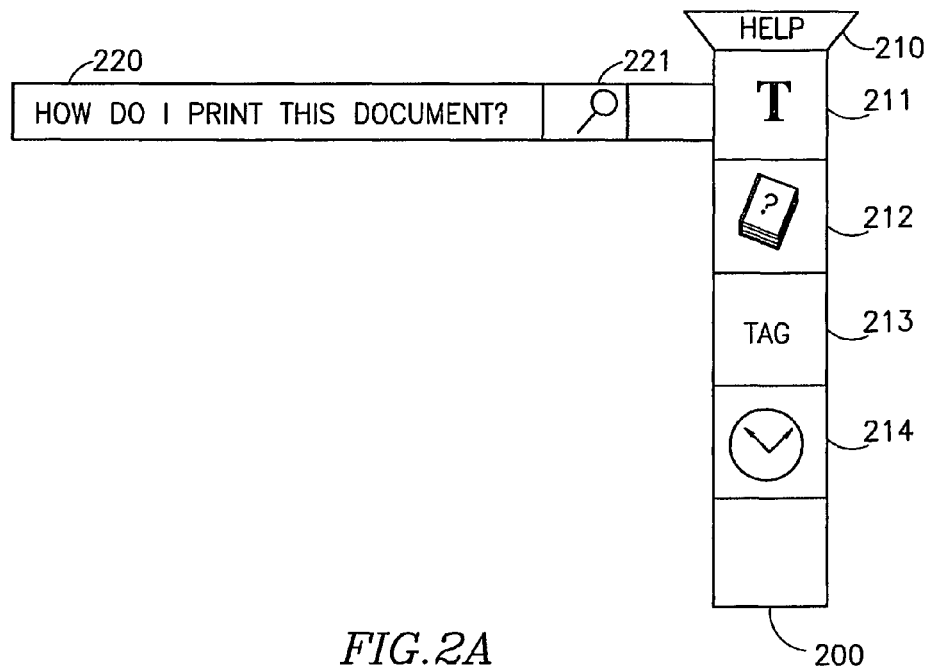
FIGS. 2A-2D are schematic block diagram illustrations of toolbars in accordance with some demonstrative embodiments.

FIG. 2A demonstrates a textual query for guidance, in which a user types a textual question ("how do I print this document"), command ("print this document"), request ("I want to print this document"), desired goal or result ("printed document"), phrase ("printing of documents"), keyword(s) ("printing"), or other free-text search query. For example, the user enters the text "how do I switch colors" in a text box 220, and then clicks on a search button 221 to initiate the search of a guidance script based on the textual query.

Figure 2B:
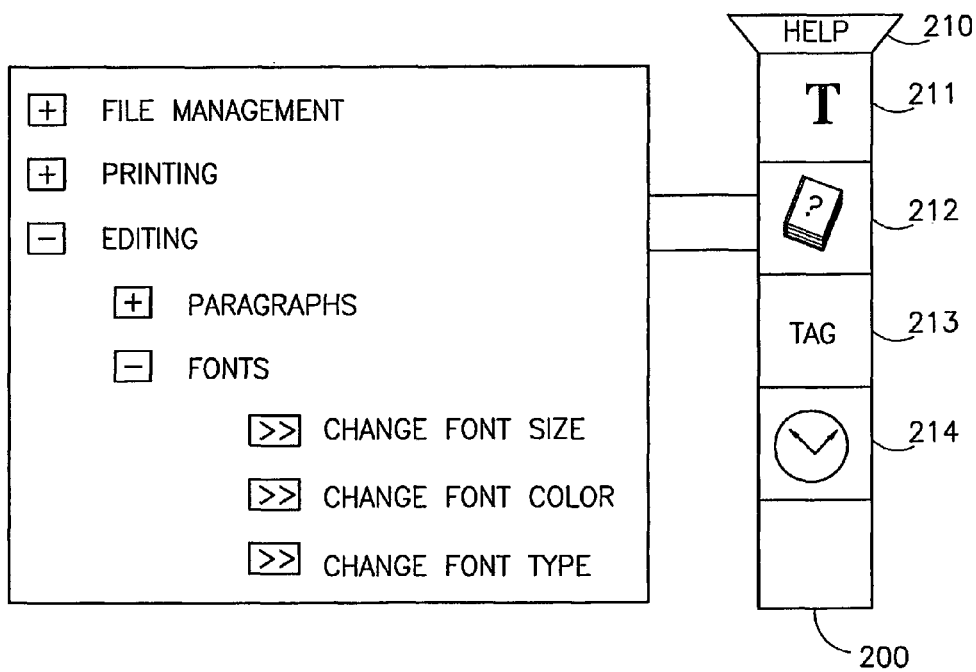

FIG. 2B demonstrates hierarchical navigation for guidance, in which the user navigates within subjects of guidance ordered as a tree 230 of categories and sub-categories. For example, items having a "plus" sign may be expanded upon their selection, to show sub-categories associated therewith. Items having a "minus" sign may be closed upon their selection, to hide sub-categories associated therewith. Items having an "arrow" may trigger the playback of a guidance script described by them, upon their selection. Other suitable indications or tree structures may be used.

Figure 2C:
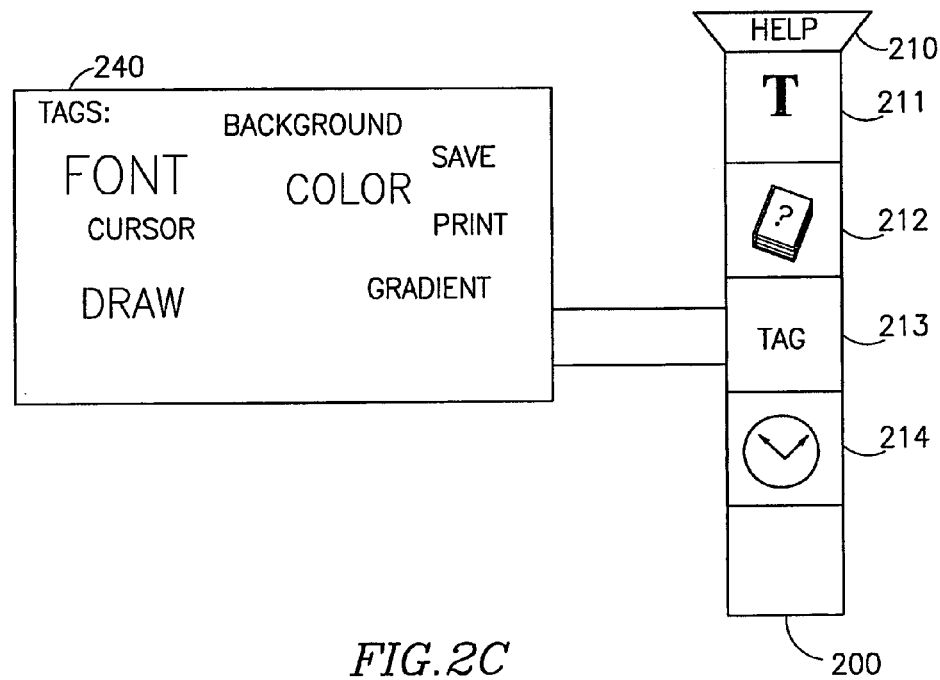

FIG. 2C demonstrates tag navigation for guidance, in which relevant keywords are displayed in a tags pane 240 using different font sizes (and optionally, using different font colors and/or font types) according to the relevancy to the user, based on the system's ranking algorithm. Clicking on a tag transfers the user (e.g., similar to "diving" or "zooming-in") to a display of the next level of keywords, displayed again according to their relevancy to the previous selected tags and according to the ranking algorithm. The tag navigation process ends when the number of relevant results is sufficiently small (e.g., smaller than a pre-defined threshold value) to be displayed to the user, or when the user asks to display the current relevant list of results list (e.g., by clicking on a dedicated button for this purpose).

Figure 2D:
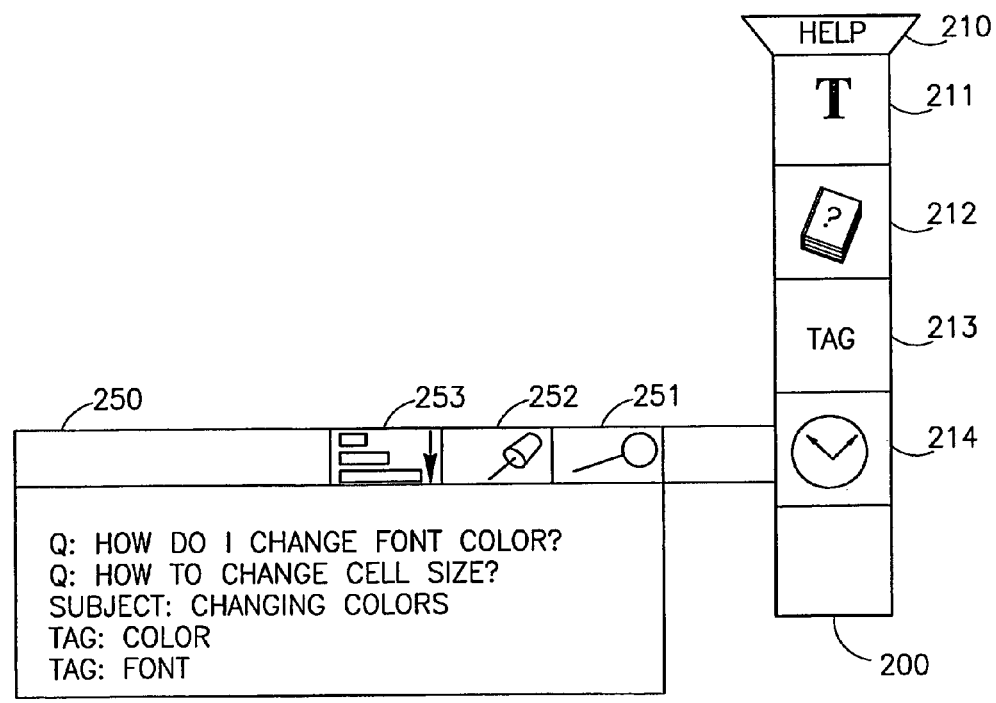

FIG. 2D demonstrates guidance navigation based on private search history of the particular user. Previous or recent searches performed by the user are displayed in a history pane 250. In some embodiments, the history pane 250 may be a drop-down menu, for example, reachable from the text box 220 of FIG. 2D. A user may select a prior search from his private history, and may re-launch the selected item by clicking on a search button 251. In some embodiments, the user utilize a "pin" button 252 to indicate that one or more prior search items are to be kept and further displayed in subsequent history-based searches.

In some embodiments, the private history pane 250 may include prior navigation searches performed by the user utilizing more than one guidance navigation method. In the demonstrative example shown in FIG. 2D, two prior free-text searches are shown, one prior hierarchical navigation item is shown, and two prior tag navigation items are shown. In some embodiments, a "sort by" button 253 may allow the user to sort the items in the private history pane 250, for example, based on chronological order, reverse chronological order, alphabetical order, reverse alphabetical order, grouped by types (e.g., free text, hierarchical, and tags), or using other suitable methods.

In some embodiments, toolbar 200 may include, for example, a public history search button, which may present to a user the recent searches for guidance submitted by other users of the system.

Referring back to FIG. 1, system 100 may utilize a ranking algorithm to determine the order in which search results are displayed to the user. The ranking algorithm may be executed, for example, by helper 140 or by a ranker 156, e.g., a ranking module which may be a component of helper 140, a separate component in device 110 or in system 100, or integrated with another component of system 100. The ranking algorithm may take into account one or more parameters, for example: textual match, e.g., searching for results that include some or all the words that appear in the user's textual query, and optionally, for example, the larger the number of matched words and the better the match is with the order of appearance of the words—the higher match score value is assigned to a match; linguistic search, for example, recognizing that two sentences have a single common meaning although slightly different phrases and words are used (e.g., "how do I change the color" and "how to modify colors"); all users search statistics, by automatically analyzing all users search inquiries and determining the most inquired subjects; private search history, such that subjects from the user's private history search may score higher in the ranking; the application's active form, such that subjects relevant to the active form in the current guided application 150 may score higher in the ranking; application's selected object, such that subjects that are relevant to the selected object in the current guided application 150 may score higher in the ranking; and/or other suitable parameters. The ranking algorithm may take into account other data, for example, information about an action that the user is currently performing or attempting to perform; for example, selection by the user of multiple cells in a table, may cause the ranking algorithm to calculate a higher rank to search results that are related to tables or to cells.

The search results may be displayed to the user by one or more suitable display methods. For example, while the user is typing a query string, a dropped-down scrollable list may open and include a list of all relevant search results according to the text that the user typed so far, ordered by the ranking algorithm. The list may be created while the user is typing (e.g., a-synchronic), and may not cause any suspension to the user experience. The search results list may include results of different types, optionally having a special prefix and/or colorful text or icon to indicate on the type of the result (e.g., "Q" indicating a free-text query; "Subj" or "Catg" indicating a search by categories; "Tag" indicating a tag navigation query; or the like). The list of search results may be displayed in a scrollable list, with an option to display the whole list (when relevant) in one click, and an option for the user to stretch or modify the boundaries of the list.

During playback of a guidance script 151, the script player 152 may be able to perform one or more operations on the guided application 150, for example, imitation of mouse actions, imitations of keyboard presses or keystrokes, or the like. Imitation of mouse actions may include, for example, imitation of right single-click, left single-click, right double-click, left double-click, drag and drop using right or left mouse button, or the like. In some embodiments, wheel mouse actions are not recorded and/or played (imitated), e.g., due to possible inaccuracy and/or resolution among different mouse devices. Imitation of mouse actions may be accompanied by a visual expression (e.g., display of text and/or graphics) explaining to the user what is taking place on the screen. Optionally, different types of colors, animations, or movements may be used to imitate mouse actions (e.g., a single right-click, in contrast with a left double-click). For example, a sequence of circles painted using a gradient of a color (e.g., pale pink, then pink, then orange, then red) may indicate a movement of the mouse; a colorization of the left mouse button of a displayed mouse may indicate a mouse click; or the like. Similarly, animation and/or colors and/or other graphical elements may be used to imitate or demonstrate pressing of one or more keys or keystrokes, in sequence or in combination, and to indicate to the user which keys are pressed and in which order.

In some embodiments, playback of a guidance script 151, and automatic execution of operations in the guided application 150 on behalf of the user, may be paused or stop, for example, if the user clicked on a "stop" button in the toolbar 154; if the user pressed a shortcut key (or key combination) corresponding to a "stop" command; if system 100 detects that the window of the guided application 150 is not in "focus" or is not the active window (e.g., the user opened another application, or another application was launched automatically, or another window popped up automatically); and/or optionally, if the user clicked on a mouse button or pressed on a keyboard key at a time in which the script player 152 does not wait for user input as part of the script. Optionally, a message box may be displayed to the user, asking the user whether to stop or resume the playback of the guidance script 151.

In some embodiments, the script player 152 may determine, during playback of the guidance script 151 and automatic execution of operations in the guided application 150 on behalf of the user, that an unexpected or "exception" situation occurred. For example, an unexpected message box popped up; a window that plays the guidance script 151 is not found; the starting condition of the guidance script 151 fails; or the like. Upon detection of such exception, the script player 152 may stop the playback of the guidance script 151; or may wait until the user fixes or modifies the situation in order to then continue the playback of the guidance script 151. In some embodiments, for example, the script player 152 may show to the user one or more guidelines on how to fix the situation, e.g., a zoom-able thumbnail of a window screenshot representing a window that should be opened by the user. In some embodiments, if a window required for playback of the guidance script 151 is opened but is minimized, the script player 152 may automatically maximize or restore the required window.

In some embodiments, the script player 152 may feature a next-action preview, allowing the user to see all the time a visual preview of the next step in the played guidance script 151. The user may select, using the toolbar 154, whether or not to display the next action preview. In some embodiments, the default option is not to show the preview, except for playback in a "step-by-step" mode in which the preview is shown as a default.

In some embodiments, the user may set or modify the playback speed, prior to playback and/or during playback. Speed may be set, for example, to a normal or default value; to a slower or faster value; or to a step-by-step mode (e.g., having a pause between steps, or waiting for a user's confirmation to proceed once a step terminates).

In some embodiments, the speeds of imitated mouse movements are pre-defined (e.g., hard-coded), for example, measured in pixels per second. In some embodiments, the time that passes between two mouse actions may depend on, for example: the screen locations corresponding to the two actions; the screen resolution; the current script play speed; optionally, a pre-defined minimum time period (e.g., if the two mouse actions locations are very close, the time between the two actions will not be less than a pre-defined number of milliseconds); a minimum time between mouse actions for a specific play speed; or the like.

In some embodiments, guidance script 151 may be played in step-by-step mode, such that a subsequent action is performed only after the user presses a "next step" button in the toolbar 154. The "next button" 154 may become visible and/or operational only in "step-by-step" mode, and/or only once the previous step terminates).

In some embodiments, toolbar 154 may allow the user to change preferences or to customize settings, to check for software updates, to open an "about" form, or the like.

In some embodiments, the script recorder 153 allows a guidance professional to set and/or modify settings of the guided application 150. For example, the script recorder 153 may be used to define an application as a new guided application, such that one or more guidance scripts 151 may be created for it and stored in the database 145 or 146. The script recorder 153 may be used to delete a guided application 150 from the database, such that all guidance scripts 151 associated therewith are deleted. The script recorder 153 may further be used to modify settings or definitions of a guided application 150. The script recorder 153 may additionally be used to create a new guidance script 151, to delete an existing guidance script 151, to modify or edit an existing guidance script 151 (e.g., modify script settings, or edit the script scenario), to play a script in whole or in part (e.g., for testing in script development stage), and to modify settings of the script recorder 153.

The script recorder 153 may be used to set and/or modify, in the relevant database 145 and/or 146, settings associated with a guided application 150. Such settings may include, for example: Application ID, indicating a technical ID defined automatically by the system 100; Application Name; Company ID, indicating a technical ID of the company or organization that makes or owns that application; Application Sub-System Name, e.g., relevant to applications having several sub-systems; Application Version(s); UI Language(s); Application Main Type (e.g., desktop, Web, legacy, console, ERP, SAP); Application GUI Technology (e.g., Windows Presentation Foundation (WPF), .net, Java), optionally being identified automatically by the system 100; Main Window Identification Method; is the application Resolution Dependent; can the application have different UIs for different users; is the application theme-able or skin-able; are the application's toolbars customizable (e.g., such that the script recorder 153 may optionally block or limit the ability of a guidance professional to record mouse events on toolbar buttons); are the application's shortcut keys customizable (e.g., such that the script recorder 153 may optionally block or limit the ability of a guidance professional to shortcut keys actions); or the like.

In some embodiments, the script recorder 153 may be used to set and/or modify, in the relevant database 145 and/or 146, settings associated with a guidance script 151, or to otherwise edit a guidance script 151. Such settings may include default script settings, for example, Suitable Resolution(s); Suitable Operating System(s); Suitable User Properties (e.g., domain, username); Scripts Categories Tree; Scripts Internal Groups List; or the like.

In some embodiments, the script recorder 153 may be used to set and/or modify, in the relevant database 145 and/or 146, other guidance script 151 settings, for example: Guided Application ID; Script modification history (e.g., username, modification date and time); Script status (e.g., "inactive" during modification process; "active"; "suspended"; "deleted"); Suitable Resolution(s); can the UI can be different for different users; Suitable Operating System(s); Suitable Users Properties; Main Title (e.g., the main question or subject of the guidance script); Sub Title(s) (e.g., optionally, additional questions or subjects that describe that script, thereby improving the matching of the script to user inquiry); Relevant Tags; Belong to Category or categories (e.g., a script can be placed under one or more categories in the guided application categories tree); Belong to an Internal (non-public) Scripts Group(s); Start Window Identification Method; Is Visible and Accessible to All Users (e.g., some scripts may be intended to be used only inside other scripts); or the like.

In some embodiments, the script recorder 153 may be used to create new guidance scripts 151, whereas a separate tool, for example, a script editor 159, may be used in order to modify or edit previously-created guidance scripts 151. In other embodiments, script editor 159 may be implemented as part of script recorder 159, which may allow both recording of new scripts and editing of previously-recorded scripts. In some embodiments, functions may be distributed over multiple devices; for example, a first guidance station may include the script recorder 153 and may be used by a first guidance professional whose expertise is creation of new scripts; whereas a second guidance station may include the script editor 159 and may be used by a second guidance professional whose expertise is debugging and/or Quality Assurance (QA) of previously-recorded scripts. Other implementations may be used.

In some embodiments, the script recorder 153 may allow efficient and user-friendly recordation of the actions performed by the guidance professional, and may track and record mouse movement, mouse clicks, keyboard presses, or combinations thereof. The tracked and saved data may include, for example, type information (e.g., keyboard or mouse action), identification information (e.g., which key was pressed), location information (e.g., which item or location was clicked-on by the mouse), timing information (e.g., when exactly was the key pressed or the mouse clicked, in relation to a time-line or in relation to previous and/or subsequent actions), or the like.

In some embodiments, the script recorder 153 may perform improvement and/or smoothing of actions performed by the guidance professional. For example, the script recorder 153 may detect that the guidance professional moved the mouse in a generally horizontal direction, which may not be perfectly horizontal due to human-hand inaccuracy; and the script recorder 153 may correct the movement by recording in its stead a "perfect" movement (e.g., exactly horizontal) or a "smoothed" movement. In some embodiments, the script recorder 153 may correct mouse movements in order to reflect a generally constant velocity of the mouse movement, instead of a slightly-changing velocity of mouse movement by the human hand. In some embodiments, the script recorder 153 may automatically identify that a mouse movement has a variable velocity due to a particular purpose (e.g., the mouse is moved, then "hovers" over an item in order to expand a menu, and then moves again); such mouse movement may be recorded and saved as is, without smoothing or improvement; or, alternatively, with partial smoothing and improvement (e.g., of the actual movement portions) but while maintaining the particular pausing of the mouse movement.

In some embodiments, the script recorder 153 may be used in order to create (and optionally modify or edit) other script features described herein, for example, guide bubbles, conditions, calling of other scripts, or the like. In some embodiments, the script recorder 153 may be associated with an audio recorder 173, thereby allowing the guidance professional to record an audible explanation that will be saved and replayed with the guidance script 151. In some embodiments, the guidance professional may type in a textual explanation, and an automatic text-to-speech converter 174 may convert the entered text into a corresponding audio clip, which may be accompany the playback of the script guidance or may be inserted to a particular location thereof.

In some embodiments, identification of the main window of a guided application 150 may be performed by one or more methods, for example: Window Caption Text Identification (optionally using asterisks or wild-cards); Image Recognition (e.g., by defining an area in the window that is expected to look exactly the same, for example, an image or icon); Text Field Identification; or the like.

In some embodiments, during recordation of a guidance script 151, the script recorder 153 interface may be hidden (in whole or in part), such that only a small semi-transparent toolbar located in the corner of the screen is visible. During the recoding phase, all relevant keyboard and mouse actions are saved, except for actions performed on the script recorder 153 interface or toolbar. For example, the script recorder 153 toolbar may include a caption indicating "Recording", and may further include buttons indicating "End and Save recording" and "Cancel Recording". Optionally, buttons and/or menus may provide one or more features, for example: add a display of a guided-bubble without a pointer (e.g., adding a display of a guided bubble to the user without the bubble to point to a specific location in the application; upon the end of the bubble creation and definition, the record process continues automatically); guided-bubble with a pointer (e.g., adding a display of a guided bubble to the user with a point to a specific location or field in the application; upon the end of the bubble creation and definition, the record process continues automatically); Condition Check; Bookmarks; "Go To" commands (e.g., to "jump" to a specific bookmark in the script); show a message to the user; pause the script for a pre-set number of seconds.

In some embodiments, the script recorder 153 may be used to edit or modify a previously-recorded guidance script 151, or portions or settings thereof, without having to re-record the entire script. Such editing and modifications may include, for example: Update the script properties; Add/Delete/Update condition check; Add/Delete/Update an action of condition check result; Add/Delete/Update "go to" command; Add/Delete/Update Bookmark; Add/Delete/Update guide-bubble without a pointer; Update guide-bubble with a pointer; or the like.

In some embodiments, a guidance script 151 may be associated with a script display table having one or more parameters, for example: Action ID (e.g., utilizing automatic numbering managed by the script recorder 153, which defines the actions order, and optionally indicating an action inside another action using hierarchically numbered action ID numbers, such as 2.1, 2.2, etc.); Action Visualization; Action Description (e.g., mouse click or double-click, key stroke, mouse and keyboard combination, guide-bubble display, condition check); Technical Details (e.g., mouse position, window details); or the like.

In some embodiments, the script recorder 153 may be a visual and non-textual tool, showing the performed actions using screenshots. In other embodiments, the script recorder 153 may utilize textual inputs from the guidance professional; for example, during the recording phase, the guidance professional may drag the mouse from a first location to a second location, or the guidance professional may otherwise indicate to the script recorder that the mouse is to be moved from a first set of screen (or window) coordinates to a second set of screen (or window) coordinates.

In some embodiments, the guidance script 151 may be stored using a textual scripting language, for example, describing the mouse and/or keyboard actions that take place during the script. Optionally, the guidance script 151 may include, or may be associated with, other types of data, for example, screenshots, animation files, audio files, text files, or the like.

In some embodiments, the script recorder 153 may allow to define one or more "fallback" actions or "safety net" actions, namely, one or more actions that will be performed by the guidance script 151 in case the previous action failed to complete for any reason. For example, if an action in the guidance script 151 fails to run, and the guidance script 153 includes a "fallback", the user will not see an error message and the guidance script 151 will continue to run without stopping. In some embodiments, for example, the guidance professional may wish to perform a click on a toolbar button, but he knows that there is a chance the user customized his toolbars and removed this specific button; so, the guidance professional adds a "fallback" action" to that toolbar button click action, in a form of a menu click action and/or a shortcut keystroke that will generate the same result in the script.

In some embodiments, the agent module 155 may be installed or provided, for example, as an a Windows Service or as an application that runs upon user login, that will run in the background perform one or more actions without any user interference, for example: scan running application and identify applications that the helper 140 has relevant guidance data for, and, upon identification of at least one such application, the agent module 155 switches the script player 152 into "standby" mode; identify a closing event of application by the user, and if the agent module 155 identifies that no relevant guided application 150 is running, then the agent module 155 may shut down the script player 152; receive version updates from the application server 147 (optionally using the updater module 141); receive updates to local database 145 from server 143 (optionally using the updater module 141); transmit statistical information about the use of helper 140; transmit technical information about problems and errors in the helper 140; or the like.

In some embodiments, helper 140 and/or system 100 may include an administration tool 157, allowing an administrator to perform one or more operations, for example: manage network definitions, list of application servers, and database servers; manage usage statistics and obtain statistics reports about the users usage of the system; manage version updates, publish version updates of system components, and distribute database updates to standalone clients; and manage technical problems reports, and obtain reports about technical problems that may occur to users.

In some embodiments, system 100 may support the option to collect statistics data about the queries of the users and to transfer them to a server, for example, so that guidance professionals may be able to improve the databases 145 and/or 146 of guidance scripts 151 with respect to guided applications 150. Data that may be collected, transferred and/or analyzed may include, for example: queries that yielded a result; queries that did not yield a result; feedback of the user about the script (e.g., at the end of each script play, the user may be able to write a feedback about the script, or to indicate whether or not the script was helpful); data about scripts that were played until the end or were stopped during playback (e.g., manually by the user, or due to a script error); or the like.

In some embodiments, a guidance script 151 may include multiple types of actions that were added during initial creation of the guidance script 151 and/or during subsequent editing of the guidance script 151. Such actions may include, for example, mouse events, single location mouse events, left click, right click, left or right double-click, right or left drag-and-drop events (e.g., the mouse click and the mouse release are performed in two different locations), keyboard events, key press, key press combinations (e.g., "CTRL+S"), or the like. In some embodiments, the group of events may be defined to include the first action starting with a "mouse down" or "key down" event, until no more mouse buttons or keyboard keys are pressed down. Script actions may further include, for example, Condition Check; Bookmark; "Go To" bookmark command; Run another script; Stop running this script command; Show a message to the user; Show a guide-bubble to the user; Pause the script for a limited time; Wait for a window to open/close; Change a window settings; Size; Position; Text (Caption); Window state (minimized or maximized); fallback action; User input validation; Close window (e.g., close a specific window, or all windows, or all windows except a specific window).

In some embodiments, each action may be associated with a suitable visualization. For example, a mouse action may be associated with a screenshot of the area where the action occurs; the screenshot also includes an illustrated image of the cursor. In case of a movement action (e.g., drag and drop), the screenshot may include a visualization or animation of the cursor's movement from the beginning to the end of the action. The image may further include an image of a mouse with the relevant mouse button highlighted. Optionally, the images of the cursor and the mouse may be semi-transparent. A keyboard action may be associated with a screenshot of the active field or window at the moment of the key stroke. The screenshot may further include an illustrated image of the key that is stroked. In case of more than one key stroked, a general image of a keyboard (optionally, semi-transparent) may be added. A combined mouse and keyboard action may be associated with a screenshot of where the action occurred, in addition to images of cursor, mouse and keyboard as described above. An action of a guide-bubble without a position may be associated with a screenshot of the guide-bubble as it appears to the user. An action of a guide-bubble with a position may be associated with a screenshot of the guide-bubble with the field or area that it points to as it appears to the user.

The script recorder 153 may allow adding condition checks to a guidance script 151. A condition check may have two or more possible answers, and may relate, for example, to: a property of a field or window in the guided application 150, optionally including the text in the window, the existence of the window, its size and position, or the like; screen resolution; OS version; User Details (e.g., user name, domain); Internet or Intranet or server connection existence; the run of another application; a specific file existence, on a local disk or on a remote file server; Showing the user a question with two or more response buttons; existence of an image in a window (e.g., optionally using image recognition); color of a specific pixel in the window (e.g., for determining the application theme or "skin"); or the like.

The condition check may have one of two or more possible results, and each possible result may trigger a script command or a sequence of script commands, for example: stop the script play, and optionally display a message to the user; continue playing the script, and optionally display a message to the user; jump to a bookmark, or "go to" command; stop current script and run another script; run another script and then continue to run current script; check another condition; or the like.

In some embodiments, a first script may call a second script. For example, a script to close a specific window may be called from another script that requires that no other windows will be opened when the other script starts. The call to another script may be performed without causing any errors or delays when running the script. For example, the closing window script may be called without necessarily having to check whether or not this window is actually opened. In some embodiments, a group or batch of scripts may be defined and called from one script, thereby allowing multi-calls to all the scripts in that group.

In some embodiments, a guidance script 151 may be programmed to wait for window(s) to open or close. For example, during the script recording process, the script recorder 152 may keep tracking the list of opened windows in the guided application 150, and may record any change (e.g., opening or closure of any window) in that list in relation to the action that the user performed and recorded. The script recorder 153 thus knows to automatically add a "Wait for a window to open/close" action in the guidance script 151 being recorded, for example, right after a specific action takes place. For example, if the guided user click on a button in the guided application 150 and as a result a new form opens, the guidance script 151 may contain a "mouse click" action and then a "wait for a window to open/close" action, such that during the replay process this guidance script 151 will not attempt to perform the next actions before the window is actually opened.

In some embodiments, the script recorder 153 allows creation, definition and management of script bookmark, which may be used to improve readability of the script as well as to "jump" to another destination in the script during the script, e.g., using a "go to" script command. In some embodiments, each guidance script 151 is associated with two automatically-created script bookmarks, for example, a "script-start" bookmark and a "script-end" bookmark. In some embodiments, bookmark names are unique, and two bookmarks may not have the same name.

In some embodiments, the script recorder 153 may allow creation of guide-bubbles. For example, if during the script playback the user may be needed to interfere, e.g., by entering data into the guided application 150 or by selecting objects, then a guide bubble will be displayed to the user. If the bubble relates to a specific point in the guided application 150 (e.g., a specific form field), then the bubble will "point" to that field. A guide bubble may be of a "mandatory" or "must to do" type, such that the playback of the guidance script 151 will not resume until the user actually performs the needed required action(s) (e.g., as validated that by the script player 152 during runtime). Alternatively, a bubble may be of an "optional" type, such that the user may choose to skip performing the action described in the bubble. A guide bubble may include one or more elements, for example: Main text (in some embodiments, this may be a mandatory element); a Hyperlink (e.g., pointing to more detailed help and explanations); icon(s); Example text (e.g., a text that will appear under the main text, in a smaller font and in brackets, and intends to give an example for the guiding text which appears in the main text of the bubble); Button(s); or the like. Guide-bubble buttons may include, for example: "I'm done" for the user to signal to the script player 152 that he finished entering the needed text; "Skip this" for the user to signal the script player 152 that he does not wish to enter an optional input; "Yes" and "No" for the user to answer a Yes/No question asked in the bubble; "Confirm" and "Cancel" for the user to confirm or cancel the text displayed in the bubble; or other suitable buttons.

Reference is made to FIGS. 3A-3E, which schematically illustrate some examples of screenshots including guide-bubbles and animations in accordance with some demonstrative embodiments. Each one of FIGS. 3A-3E shows a computer screenshot 311-313 including a guided application window 320 and a helper toolbar 330.

Figure 3A:
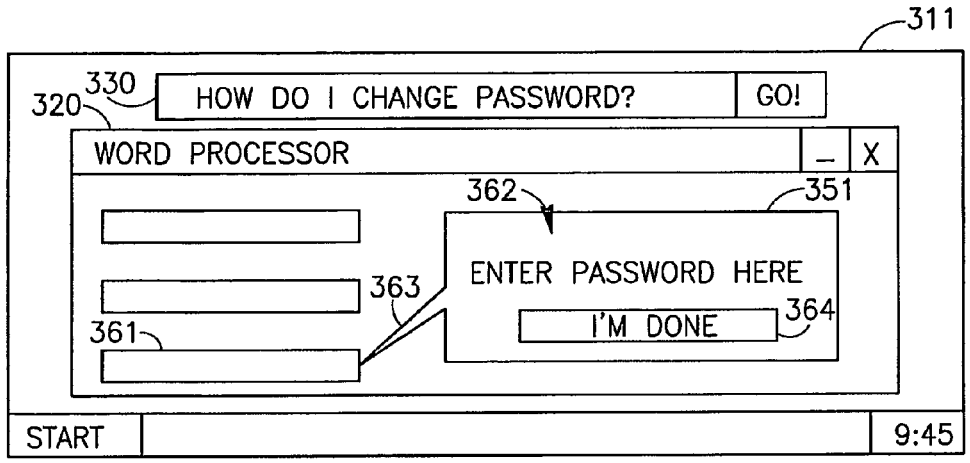
FIGS. 3A-3E are schematic block diagram illustrations of screenshots including guide-bubbles and animations in accordance with some demonstrative embodiments.

FIG. 3A demonstrates a location-based "mandatory" guide-bubble 351 which points to a particular area of the guided application window 320, for example, to a text field 361 in which the user is required to enter his input. The guide-bubble 351 includes a descriptive portion 362, indicating to the user that he is required to input text; a pointer 363 pointing to the text field 361; and a button 364 titled "I'm done" on which the user should click upon entering the text in the text field 361.

Figure 3B:
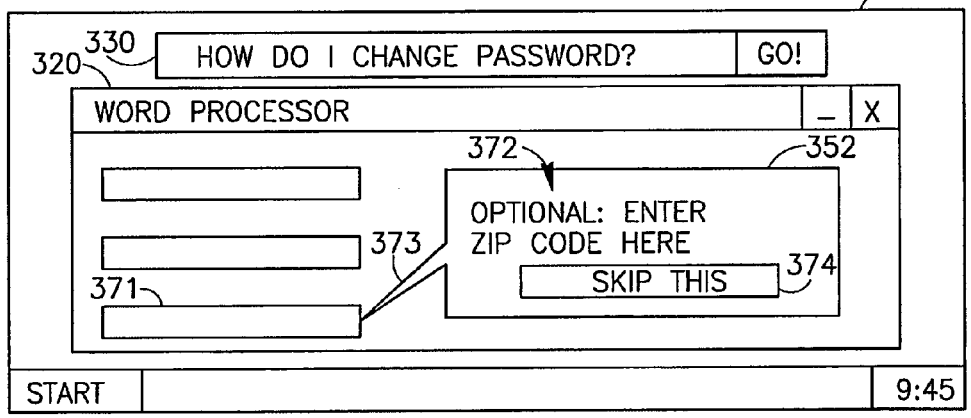

FIG. 3B demonstrates a location-based "optional" guide-bubble 352 which points to a particular area of the guided application window 320, for example, to a text field 371 in which the user is requested to optionally enter his input. The guide-bubble 352 includes a descriptive portion 372, indicating to the user that he is requested to input text; a pointer 373 pointing to the text field 371; and a button 374 titled "Skip this" on which the user may click upon entering the text in the text field 371. In some embodiments, the guide-bubble 352 may further include an "I'm done" button, on which the user may click upon entering the text. In some embodiments, the "Skip this" button 374 may automatically change into an "I'm done" button, for example, after detecting that the user entered at least one character in the text field 371.

Figure 3C:
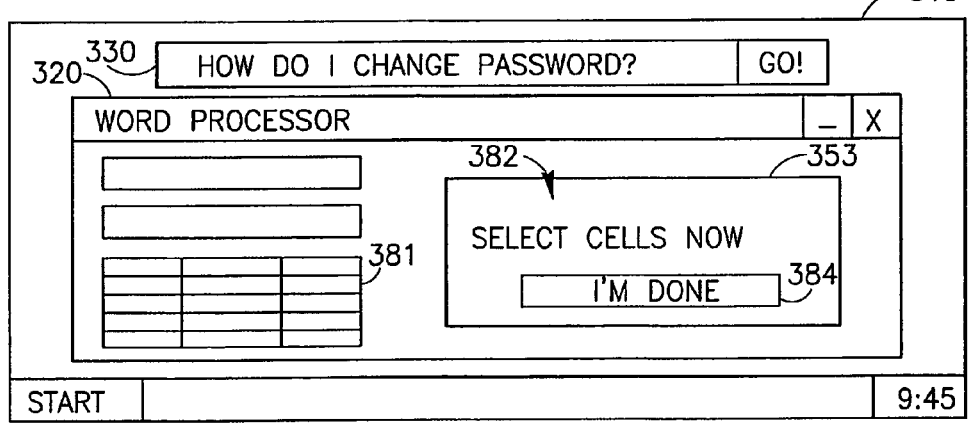

FIG. 3C demonstrates a pointer-less "mandatory" guide-bubble 353 which does not point to a particular area of the guided application window 320, but which may be displayed in proximity to a relevant area of the guided application window 320 on which the user is required to operate. The guide-bubble 353 includes a descriptive portion 382, indicating to the user that he is required to select cells from a table 381; and a button 384 titled "I'm done" on which the user should click upon selection of the cells in the table 381.

Other suitable guide-bubbles may be used, and other suitable combinations of features of guide-bubbles may be used, for example, mandatory, optional, location-based, pointer-less, or the like.

Figure 3D:
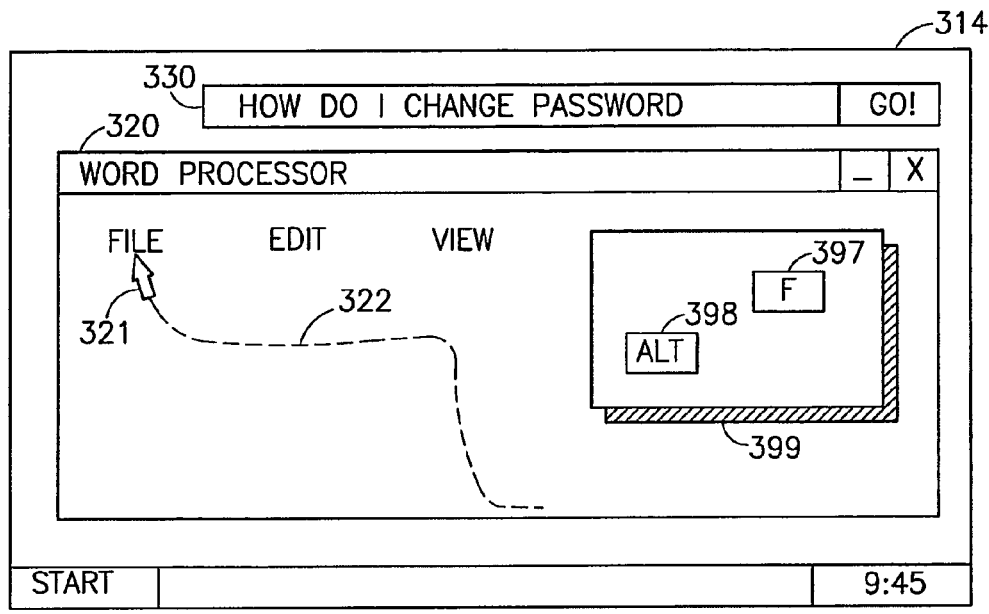

FIG. 3D demonstrates an animation or imitation of a "gesture", for example, a movement of a mouse pointer 321 on guided application 320. For example, the mouse pointer 321 may be moved across the screen, and a trail 322 behind its movement may be illustrated using a dotted line or using other graphical element (e.g., a trace of color).

In some embodiments, an animation or imitation of keystrokes may be used. For example, instead of moving the mouse pointer 321 along the trail 322 (e.g., towards the "File" menu in guided application 320), a similar result may be achieved by pressing a keyboard combination, for example, the "ALT" key together with the "F" key. This may be animated or imitated similar to the animation or imitation of the mouse movement. For example, a pop-up window 399 may be displayed on top of the guided application 320, showing a graphical representation of the relevant keys of the keyboard (e.g., keys 398 and 397), and animating the keys in accordance with a suitable order (for example, the "ALT" key 398 changes its color to indicate that it is being pressed, then the "F" key 397 changes its color to indicate that it is also being pressed, and then both keys 397 and 398 change back their color to indicate their release). Other suitable mechanisms may be used to animate or imitate keystrokes.

Figure 3E:
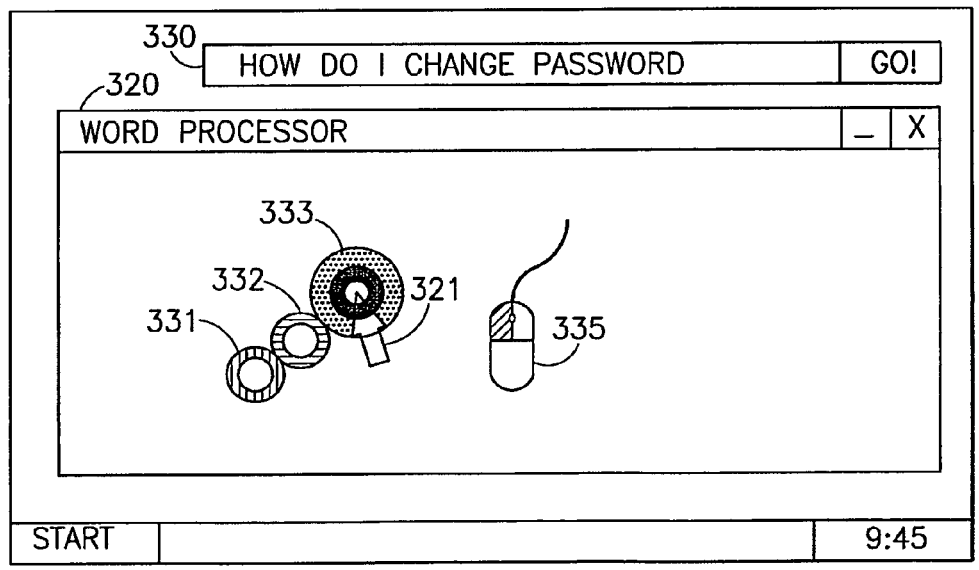

FIG. 3E demonstrates an animation or imitation of a mouse-click, for example, using a set of multiple circles 331-33 and/or using a depiction of a mouse 335. For example, a first circle 331 has a light color (e.g., light pink), a second circle 332 has a second, darker color (e.g., darker pink), and a third circle 333 has a third, darker color (e.g., red) or a combination of two circles and/or two colors. This may indicate that the mouse pointer 321 is moved along the route formed by the multiple circles 331-333; and that the mouse pointer 321 comes to a halt at the third circle 333, which may be larger and/or darker and/or may include a combination of colors or shapes. In some embodiments, a single circle may indicate a click, whereas a circle-within-a-circle may indicate a double-click. Optionally, the depiction of the mouse 335 may indicate that the mouse-pointer is moved using a mouse; and one of the mouse buttons may optionally be colored or otherwise emphasized (e.g., using a texture) in order to indicate that the mouse button is clicked.

Referring again to FIG. 1, some embodiments may perform validation of user input. For example, when a user is asked to enter data to a field during playback of a guidance script 151 (e.g., optionally using a pointing guide-bubble), the guidance script may include a validation process to check or validate to the user input, e.g., numeric validation, alpha-numeric validation, date format validation, zip code validation, or custom string format validation.

In some embodiments, at the end of guidance script 151 playback, a "Script Ended" message may be displayed to the user. Optionally, the user may be asked to answer one or more questions (e.g., a poll or a survey) regarding the quality of assistance that he received; and user responses may be collected and analyzed in order to improve guidance scripts. In some embodiments, the user may be presented with the option to select and playback other guidance script(s), that are automatically selected by the system 100 based on, for example, contextual relation to the currently-ending guidance script; being in the same category or sub-category as the currently-ending guidance script; being a guidance script that other users typically play after the playback of the currently-ending guidance script; an organizational workflow with pre-defined settings (e.g., if an administrator or the organization pre-defined that a guidance script titled "how to change my password" is to be played after playback of a guidance script titled "how to log-in"); or the like.

Some embodiments may utilize automatic script suspension. For example, if a guidance script 151 playback fails for some reason (e.g., except for getting stopped manually by the user) this information may be collected. If the system 100 identifies that a particular guidance script 151 keeps failing during replay by different users, an automatic suspension of this guidance script 151 may be performed, and an administrator may review statistics and other information about this guidance script 151 using the administration tool.

Some embodiments may utilize script start conditions. For example, when a script recording starts, the script recorder 153 may automatically identify the current state of the opened windows in the guided application 150, and may define (e.g., as a default) that the current state is a required condition in order to start the script run. The guidance professional who prepares the guidance script 151 may edit this condition and may define which of the opened windows are part of the script start conditions, and which are not. In some embodiments, for each opened window which is part of the script start condition, a screenshot of the window may be automatically captured and saved in order to later show the user which open window is required in order to start the script.

Some embodiments may utilize one or more custom algorithms. For example, the script recording and/or script replaying mechanisms may utilize Optical Character Recognition (OCR) algorithms and/or Image Recognition algorithms, in order to identify the appropriate place to record and/or play the scripts actions.

In some embodiments, system 100 may include one or more OCR engines, having text and/or image recognition capabilities, for example: an OCR engine 171 associated with the script player 152 and utilized for script playback; and/or an OCR engine 172 associated with the script recorder 153 and utilized for script recording or editing. In the recording phase, the OCR engine 172 may identify a text item that appears under or near the mouse pointer; and may assist in identifying and/or capturing an image located under or near the mouse pointer, e.g., by determining boundaries. In the playback phase, the OCR engine 171 may be used in order to find on the screen the location of a particular textual item (or image) which appears in the recorded guidance script. Other functions may be performed by OCR engines 171 and/or 172, which may include text and/or image identification capabilities.

In some embodiments, system 100 may utilize pre-defined mechanisms to bridge a possible gap between the data recorded by the script recorder 153 and the data which is required for playback by the script player 152. For example, the OCR engine 171 may not be able to recognize, in the playback phase, a particular textual item that was recognized and saved during the recording phase (e.g., due to difference in screen resolution or dimensions). In response, system 100 may utilize a mechanism which determines partial matches or sufficiently-close matches (e.g., a recognized string of "passwor", although it is missing the final character "d" in order to be a correct word in English, may be sufficiently closed to a recorded "password"), optionally utilizing a spell-checker or a text similarity analyzer.

In some embodiments, OCR operations may be performed on an original screenshot, e.g., a color screenshot. In other embodiments, OCR operations may be performed, additionally or alternatively, on modified screenshots, e.g., resized screenshots, portions of screenshots, grey-scaled screenshots or black-and-white versions of screenshots, inverted versions of screenshots or of grey-scaled screenshots or of black-and-white versions of screenshots, or the like. In some embodiments, each captured screenshot may be converted into a black-and-white image having a one-bit color depth, and optionally having an inverted version saved therewith.

In some embodiments, OCR operations may include, for example, detection and/or isolation of "batches" or "islands" of similar colors or similar patterns (e.g., blacks, or whites); and a separate analysis of each batch for letter-by-letter (or character-by-character) recognition. In some embodiments, batches of pixels may be resized, or may be checked against one or more pre-defined conditions (e.g., that the horizontal width of a batch is not more than 150 percent of the vertical length of the batch). In some embodiments, neural networks may be used in the OCR process. In some embodiments, the OCR process may include, for example, identification and/or removal of underlines from textual items, identification of spaces between words (e.g., greater than spaces between letters), or other features. In some embodiments, the OCR operations may include image comparisons, for example, to identify an image (e.g., an icon or a button).

In some embodiments, one or more OCR or image recognition algorithms may be used. A demonstrative algorithm is described herein, yet other suitable algorithms may be used, in addition or instead. For example, the OCR algorithm may include capturing a screenshot, e.g., including therein the guided application 150. The original screenshot of the guided application 150 may be stored or saved. The original screenshot, which may be a color screenshot (e.g., having 8-bit color depth, 16-bit color depth, 24-bit color depth, or the like) may be converted into a single-bit color depth screenshot, namely, a black-and-white screenshot, which may be stored or saved ("BW-1"). Additionally, the black-and-white single-bit screenshot BW-1 may be inverted, such that white pixels replace black pixels and vice versa, and the inverted single-bit screenshot may be stored or saved ("BW-2"). In some embodiments, OCR operations may be performed on both the single-bit screenshot BW-1 and the inverted single-bit screenshot BW-2. This may allow, for example, recognition of text which originally appears inverted, or using a light color (e.g., white or yellow) over a dark background (e.g., black or blue).

The OCR algorithm may proceed to search for "islands" or batches of interconnected pixels. The search may be performed on both the single-bit screenshot BW-1 and the inverted single-bit screenshot BW-2. For example, a sequence of interconnected pixels having a common color (namely, black or white) surrounded by pixels of the other color (namely, white or black, respectively) may be detected and defined as "island". In some embodiments, for example, an "island" of pixels may correspond to a letter or a digit (or other single character), and a sequence of "islands" of pixels located in proximity to each other may correspond to a word.

In some embodiments, the determination that an identified "island" of interconnected pixels represents a particular character may be performed using one or more Neural Networks (NNs) or Artificial Neural Networks (ANNs). For example, a mathematical or computational model may be used, based on biological neural networks, and utilizing an interconnected group ("island") of artificial neurons ("pixels") which processes information using a connectionist approach to computation. The NNs may be used is an adaptive system that modifies its structure, optionally utilizing non-linear statistical data modelling tools. The NNs may be used in order to find patterns in "islands" of interconnected pixels, which correspond to characters (e.g., letters, digits, punctuation marks, special symbols such as "@" or "%", or the like). In some embodiments, algorithms utilizing NNs may check whether or not an "island" of interconnected pixel is identical or is sufficiently-similar to a reference pattern, which corresponds to a character. Optionally, the algorithm may add and/or remove a pixel, or multiple pixels, within the "island" or at its boundaries, and then repeat the comparison to reference patterns. In some embodiments, the NN algorithm may utilize input nodes (e.g., corresponding to pixels in the "island"), output nodes, and hidden nodes, and a training phase may be used with respect to a reference set of characters, optionally using back-propagation with or without momentum, as well as optimization and modification of step-size. In some embodiments, an optimized NN algorithm may be faster and/or more accurate than a feature extraction algorithm; for example, since the NN algorithm may utilize information learned in its training phase, instead of doing. In some embodiments, both NN algorithms and feature extraction algorithms may be used for OCR purposes.

In some embodiments, OCR and/or other image analysis may be performed with regard to the screen area which is directly under the mouse pointer; with regard to a pre-defined rectangle or other shape (e.g., having pre-defined dimensions) which surrounds the position of the mouse pointer; and/or with regard to one or more areas or screen portions which are adjacent to the position of the mouse pointer. This may allow, for example, improved analysis and identification of what exactly the user clicked on, during a script recording phase. For example, in some embodiments, it may not be sufficient to determine that the user (e.g., in a script recording phase) clicked on a button labeled with "OK", since there may be more than one windows or tabs open with an "OK" button, or it may be required to associate the clicked "OK" button with a context for which the user approval was provided. Accordingly, image recognition or OCR operations, or other suitable analysis, may be performed with regards to other screen portions, in order to determine, for example, that the clicking on the "OK" button is associated with a particular operations (e.g., confirmation to delete a file, confirmation to print, or the like). Other mechanisms may be used in order to analyze and/or take into account screen areas that are adjacent to the mouse pointer or surround the mouse pointer, in order to enhance the determination of what exactly the user clicked on, and to which context or operational phase of the guided application 150 this mouse-click is related.

Figure 4:
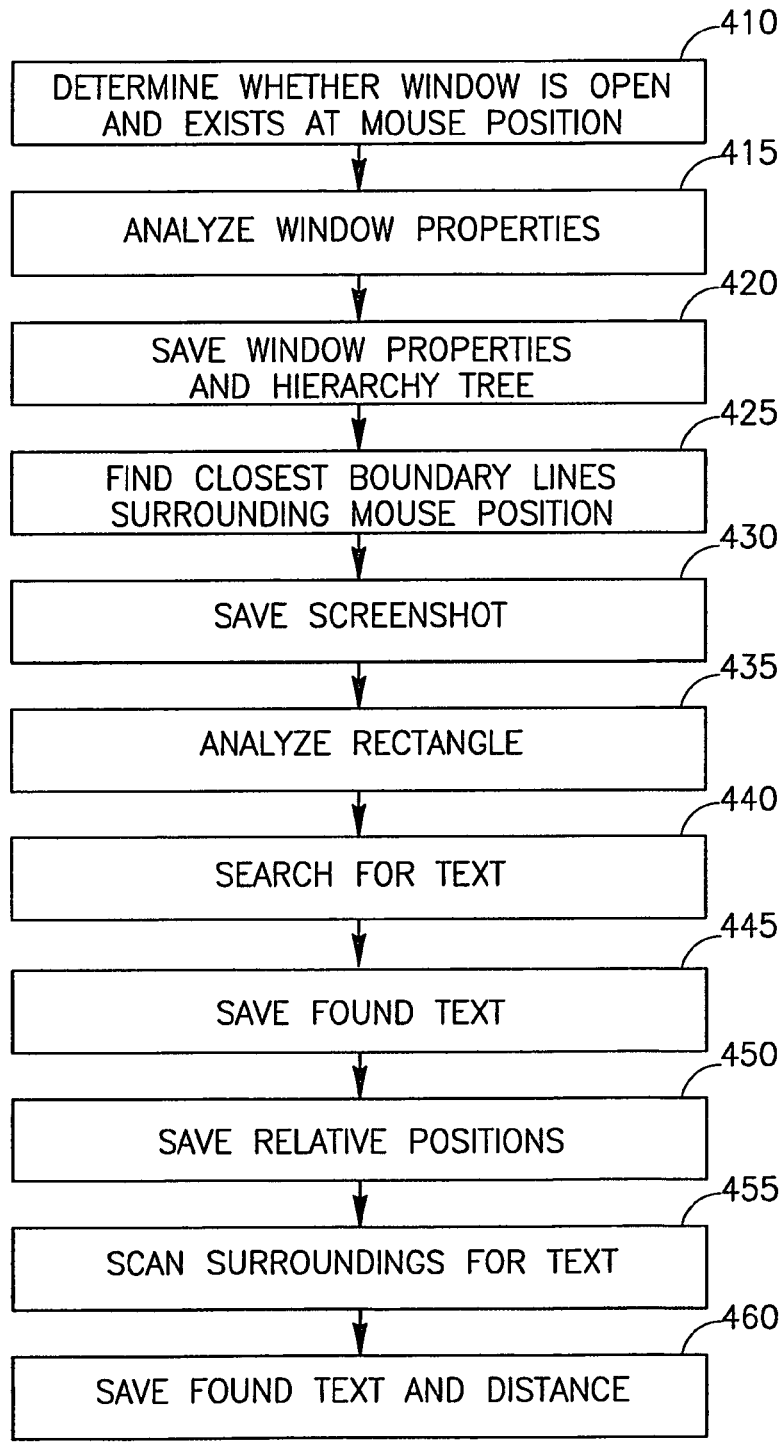
FIG. 4 is a schematic flow-chart of a method of recording a mouse click for a guidance script, in accordance with some demonstrative embodiments.

FIG. 4 is a schematic flow-chart of a method of recording a mouse click for a guidance script, in accordance with some demonstrative embodiments. Operations of the method may be used, for example, by system 100 of FIG. 1.

In some embodiments, the method may include, for example, determining whether a "window" is open and exists at the mouse position (block 410), analyzing the window properties (block 415), and saving the window properties and the windows hierarchy tree (block 420).

In some embodiments, the method may include, for example, finding the closest boundary lines surrounding the mouse position (block 425); and saving screenshot(s) of that rectangle (block 430) from the current window state (when mouse is down) and from the window screenshot before the mouse click occurred (e.g., utilizing a previously-saved screenshot of the window, which is saved every time a new window is opened/resized).

In some embodiments, the method may include, for example, analyzing the rectangle (block 435), searching for text (e.g., using OCR) (block 440), and saving any found text (block 445).

In some embodiments, the method may include, for example, saving the relative position in the main window of the clicked rectangle/window, including the relative position of the scrollbars and the main window size (block 450).

In some embodiments, the method may include, for example, scanning (e.g., using OCR) the surrounding of the window/rectangle (right, left, top, bottom) for any text (block 455), and saving the identified text items and their distance from the window/rectangle (block 460). In some embodiments, the operations of blocks 455-460 may be performed only if it is determined that the window/rectangle appears more than once in guided application window (e.g., text fields).

Other suitable operations or sets of operations may be used.

Figure 5:
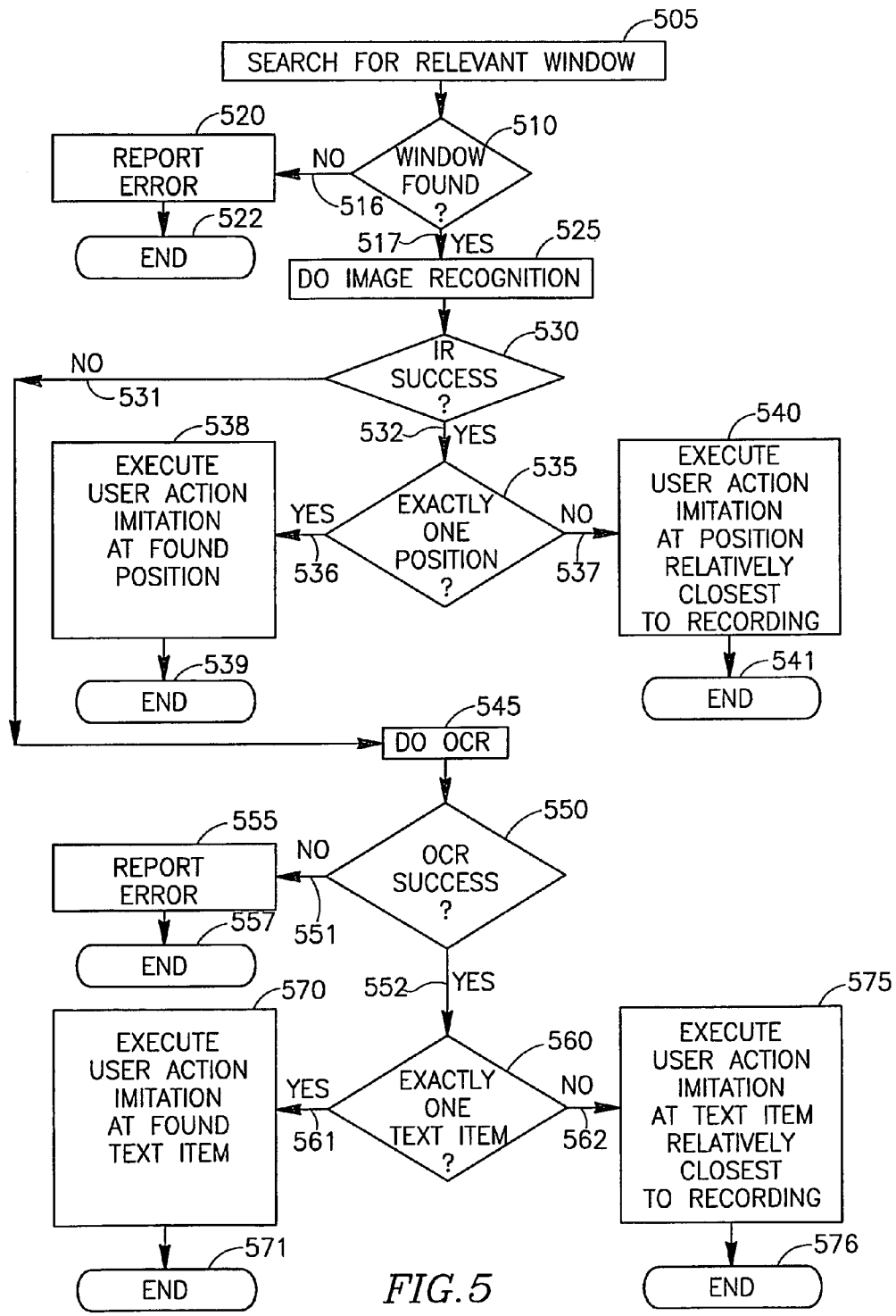
FIG. 5 is a schematic flow-chart of a method of replaying a mouse click of a guidance script, in accordance with some demonstrative embodiments.

FIG. 5 is a schematic flow-chart of a method of replaying a mouse click of a guidance script, in accordance with some demonstrative embodiments. Operations of the method may be used, for example, by system 100 of FIG. 1.

In some embodiments, the method may include, for example, searching for the relevant window in which the action is to be performed (block 505).

In some embodiments, the method may include, for example, checking whether or not a relevant window was found (block 510).

If a relevant window was not found (arrow 516), then the method may include reporting the error (block 520) and then ending (block 522).

In contrast, if the relevant window was found (arrow 517), then the method may proceed with the operations of block 525 and onward.

In some embodiments, the method may include, for example, using Image Recognition to search, in the relevant window, for an image on which the action is to be performed (block 525).

In some embodiments, the method may include, for example, checking whether or not the image recognition was successful (block 530).

If the image recognition was not successful (arrow 531), then the method may proceed with the operations of block 545 and onward.

In contrast, if the image recognition was successful (arrow 532), then the method may proceed by checking whether exactly one relevant screen position was found, or multiple relevant screen positions were found (block 535). If exactly one relevant screen position was found (arrow 536), then the method may include executing the user action imitation at that screen position (block 538), and then ending (block 539). Alternatively, if more than one relevant screen position was found (arrow 537), then the method may include executing the user action imitation at the screen position which is the relatively the closest to the original screen position in the recording phase (block 540), and then ending (block 541)

Referring again to block 545, in some embodiments, the method may include, for example, using Optical Character Recognition (OCR) to search, in the relevant window, for a text on which the action is to be performed (block 545).

In some embodiments, the method may include, for example, checking whether or not the OCR was successful (block 550).

If the OCR was not successful (arrow 551), then the method may include reporting the error (block 555) and then ending (block 557).

In contrast, if the OCR was successful (arrow 552), then the method may proceed by checking whether exactly one relevant text item was found, or multiple relevant text items were found (block 560). If exactly one relevant text item was found (arrow 561), then the method may include executing the user action imitation at that text item (block 570), and then ending (block 571). Alternatively, if more than one relevant text items was found (arrow 562), then the method may include executing the user action imitation at the text item which is relatively the closest to the original text item in the recording phase (block 575), and then ending (block 576).

Other suitable operations may be used.

Some embodiments may utilize other particular or "atomic" algorithms, which may be used within or as part of other algorithms. Particular algorithms may include, for example: obtaining a screenshot of a window scrolled-over; obtaining the window located under at a specific point on the screen; obtaining a screenshot, size and position of the rectangle surrounding a specific point in a image; obtaining the text in a rectangle image-screenshot (e.g., using OCR); obtaining a location of an image inside another image (e.g., window screenshot), optionally in a way independent of background color and/or theme; obtaining a location of a text in an image (e.g., window screenshot), optionally in a way independent of font type, font color, font style, font size, or other font features; or other suitable algorithms.

Other suitable operations or sets of operations may be used in accordance with some embodiments. Some operations or sets of operations may be repeated, for example, substantially continuously, for a pre-defined number of iterations, or until one or more conditions are met. In some embodiments, some operations may be performed in parallel, in sequence, or in other suitable orders of execution.

In some embodiments, components and/or units may be able to interact through one or more communication channels or mediums or links, for example, a shared access medium, a global communication network, the Internet, the World Wide Web, a wired network, a wireless network, a combination of one or more wired networks and/or one or more wireless networks, one or more communication networks, an a-synchronic or asynchronous wireless network, a synchronic wireless network, a managed wireless network, a non-managed wireless network, a burstable wireless network, a non-burstable wireless network, a scheduled wireless network, a non-scheduled wireless network, or the like.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Some embodiments may be implemented by software, by hardware, or by any combination of software and/or hardware as may be suitable for specific applications or in accordance with specific design requirements. Some embodiments may include units and/or sub-units, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Some embodiments may be implemented, for example, using a machine-readable medium or article which may store an instruction or a set of instructions that, if executed by a machine, cause the machine to perform a method and/or operations described herein. Such machine may include, for example, any suitable processing platform, computing platform, computing device, processing device, electronic device, electronic system, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the claims are intended to cover all such modifications, substitutions, changes, and equivalents.

What is claimed is:

1. A method of providing interactive guidance to a user of a computerized application, the method comprising:
    receiving a user request to obtain interactive guidance with respect to said computerized application;
    based on the user request, selectively retrieving an interactive guidance script from a repository of previously-recorded interactive guidance scripts, wherein said interactive guidance script comprises instructions for performing one or more actions in said computerized application on behalf of the user, for displaying guidance text associated with at least one of said actions, and for enabling the user to enter data comprising a character string into one or more fields in the computerized application in response to at least some of said guidance text; and playing said interactive guidance script,
to automatically execute said one or more actions in said computerized application on behalf of the user, to display said guidance text in association with at least one of said actions, and to enable the user to enter said data into said one or more fields in said computerized application, in response to at least some of said guidance text.

2. The method of claim 1, wherein playing the interactive guidance script comprises performing at least one of:
 imitating a mouse movement;
 imitating a mouse click; and
 imitating a press of one or more keyboard keys.

3. The method of claim 1, wherein selectively retrieving the interactive guidance script comprises selecting the interactive guidance script based on at least one of:
 a hierarchical tree of categories of interactive guidance scripts;
 tag-based navigation among tags associated with interactive guidance scripts;
 textual search of text items associated with interactive guidance scripts;
 navigation through historic search items of said user; and
 navigation through historic search items of one or more other users.

4. The method of claim 1, further comprising:
 in connection with playing the interactive guidance script, modifying a display of the computerized application presented to the user by performing at least one of:
 restoring a window;
 closing a window;
 modifying a size of a window;
 modifying a location of a window;
 modifying a property of a window;
 maximizing a window;
 minimizing a window; and
 opening a window.

5. The method of claim 1, wherein playing said interactive guidance script comprises at least one of:
 calling from said interactive guidance script another interactive guidance script;
 checking whether or not a condition holds true in order to determine whether or not perform a script action;
 jumping from a first location of said interactive guidance script to a second location of said interactive guidance script; and
 validating data received from said user during the playing of said interactive guidance script.

6. The method of claim 1, wherein playing said interactive guidance script comprises at least one of:
 performing Optical Character Recognition (OCR) on a display showing said computerized application to determine a location of a textual item on which a script action is to be performed; and
 performing image recognition on said display showing said computerized application to determine a location of a graphical item on which a script action is to be performed.

7. The method of claim 1, further comprising: presenting to the user a toolbar comprising one or more of:

a selectable option to pause the playing of the interactive guidance script; and
 a selectable option to stop the playing of the interactive guidance script.

8. The method of claim 1, wherein the computerized application comprises an application selected from the group consisting of:
 an application configured to run on a computer,
 an application configured to run on a mobile phone,
 an application configured to run on a mobile computing device,
 an application configured to run on a handheld computing device,
 an Operating System,
 an application configured to run on a gaming console,
 an application configured to run on a gaming device, and
 an application configured to run on an electronic device having a User Interface (UI).

9. The method of claim 1, wherein playing the interactive guidance script is in response to receiving a user command through a helper module, and wherein the helper module is selected from the group consisting of:
 an add-on to said computerized application;
 a plug-in of said computerized application;
 an extension of said computerized application;
 a module embedded within said computerized application;
 a module of said computerized application;
 a help module internal to said computerized application;
 a help module external to said computerized application;
 a help module associated with said computerized application;
 an interface component internal to said computerized application;
 a particular guidance module adapted to provide guidance to said computerized application; and
 a general guidance module adapted to provide guidance to a plurality of computerized applications.

10. The method of claim 1, further comprising validating the data entered by the user against a criterion.

11. A non-transitory computer-readable medium having stored therein instructions for providing interactive guidance to a user of a computerized application, wherein the instructions, when executed by the computer, cause the computer to:
 receive a user request to obtain interactive guidance with respect to said computerized application;
 selectively retrieve, based on the user request, an interactive guidance script from a repository of previously-recorded interactive guidance scripts, wherein said interactive guidance script comprises instructions for performing one or more actions in said computerized application on behalf of the user, for displaying guidance text associated with at least one of said actions, and for enabling the user to enter data comprising a character string into one or more fields in the computerized application in response to at least some of said guidance text; and
 play said interactive guidance script, to automatically execute said one or more actions in said computerized application on behalf of the user, to display said guidance text in association with at least one of said actions, and to enable the user to enter said data into said one or more fields in said computerized application, in response to at least some of said guidance text.

12. The non-transitory computer-readable medium of claim 11, wherein the script player is to imitate at least one of:
- a mouse movement;
- a mouse click; and
- a press of one or more keyboard keys.

13. The non-transitory computer-readable medium of claim 11, wherein the helper module is to select the interactive guidance script based on at least one of:
- a hierarchical tree of categories of interactive guidance scripts;
- tag-based navigation among tags associated with interactive guidance scripts;
- textual search of text items associated with interactive guidance scripts;
- navigation through historic search items of said user; and
- navigation through historic search items of one or more other users.

14. The non-transitory computer-readable medium of claim 11, wherein, in connection with playing the interactive guidance script, the script player is to modify a display of the computerized application presented to the user by performing at least one of:
- restoring a window;
- closing a window;
- modifying a size of a window;
- modifying a location of a window;
- modifying a property of a window;
- maximizing a window;
- minimizing a window; and
- opening a window.

15. The non-transitory computer-readable medium of claim 11, wherein the script player is to perform at least one of:
- calling from said interactive guidance script another interactive guidance script;
- checking whether or not a condition holds true in order to determine whether or not perform a script action;
- jumping from a first location of said interactive guidance script to a second location of said interactive guidance script; and
- validating data received from said user during the playing of said interactive guidance script.

16. The non-transitory computer-readable medium of claim 11, wherein the script player is to perform at least one of:
- Optical Character Recognition (OCR) on a display showing said computerized application to determine a location of a textual item on which a script action is to be performed; and
- image recognition on said display showing said computerized application to determine a location of a graphical item on which a script action is to be performed.

17. The non-transitory computer-readable medium of claim 11, wherein the user interface is to present to the user a toolbar comprising one or more of:
- a selectable option to pause the playing of the interactive guidance script; and
- a selectable option to stop the playing of the interactive guidance script.

18. The non-transitory computer-readable medium of claim 11, wherein the computerized application comprises an application selected from the group consisting of:
- an application capable of running configured to run on a computer,
- an application capable of running configured to run on a mobile phone,
- an application capable of running configured to run on a mobile computing device,
- an application capable of running configured to run on a handheld computing device,
- an Operating System,
- an application capable of running configured to run on a gaming console,
- an application capable of running configured to run on a gaming device, and
- an application capable of running configured to run on an electronic device having a User Interface (UI).

19. The non-transitory computer-readable medium of claim 11, wherein the helper module comprises a component selected from the group consisting of:
- an add-on to said computerized application;
- a plug-in of said computerized application;
- an extension of said computerized application;
- a module embedded within said computerized application;
- a module of said computerized application;
- a help module internal to said computerized application;
- a help module external to said computerized application;
- a help module associated with said computerized application;
- an interface component internal to said computerized application;
- a particular guidance module adapted to provide guidance to said computerized application; and
- a general guidance module adapted to provide guidance to a plurality of computerized applications.

20. The non-transitory computer-readable medium of claim 11, wherein the user request to obtain interactive guidance is received through at least one of: a toolbar, a button, a menu, a drop-down menu, a pane, a link, a hyperlink, an icon, a textual item, a graphical representation, a clickable item, and a selectable item.

21. The non-transitory computer-readable medium of claim 11, wherein the script player is to perform validation of the data entered by the user against a criterion.

* * * * *